United States Patent
Bandai et al.

(10) Patent No.: US 10,780,787 B2
(45) Date of Patent: Sep. 22, 2020

(54) FUEL CELL VEHICLE AND CONTROL METHOD THEREOF

(71) Applicant: TOYOTA JIDOSHA KABUSHIKI KAISHA, Toyota-shi, Aichi-ken (JP)

(72) Inventors: Hiroyuki Bandai, Toyota (JP); Tomohiko Mizukoshi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 334 days.

(21) Appl. No.: 15/900,125

(22) Filed: Feb. 20, 2018

(65) Prior Publication Data

US 2018/0236894 A1   Aug. 23, 2018

(30) Foreign Application Priority Data

Feb. 22, 2017 (JP) ................................ 2017-030851

(51) Int. Cl.
| | | |
|---|---|---|
| *B60L 58/00* | (2019.01) | |
| *B60L 11/18* | (2006.01) | |
| *H01M 8/04014* | (2016.01) | |
| *B60L 58/33* | (2019.01) | |
| *H01M 8/04537* | (2016.01) | |
| *H01M 8/04701* | (2016.01) | |

(Continued)

(52) U.S. Cl.
CPC ........... *B60L 11/1892* (2013.01); *B60L 58/33* (2019.02); *H01M 8/04014* (2013.01); *H01M 8/04074* (2013.01); *H01M 8/04537* (2013.01); *H01M 8/04701* (2013.01); *H01M 8/04731* (2013.01); *H01M 8/04992* (2013.01); *B60L 2240/36* (2013.01); *B60L 2240/68* (2013.01); *H01M 2250/20* (2013.01); *Y02T 10/7005* (2013.01); *Y02T 90/161* (2013.01); *Y02T 90/32* (2013.01)

(58) Field of Classification Search
None
See application file for complete search history.

(56) References Cited

U.S. PATENT DOCUMENTS 6,672,415 B1 * 1/2004 Tabata ................. B60W 10/10
                                                         180/65.25
7,189,467 B2 * 3/2007 Wakabayashi .... H01M 8/04029
                                                         429/429

(Continued)

FOREIGN PATENT DOCUMENTS

JP   2011-211868 A   10/2011
JP   2012-209109     10/2012

(Continued)

*Primary Examiner* — Truc M Do
(74) *Attorney, Agent, or Firm* — Finnegan, Henderson, Farabow, Garrett & Dunner, LLP

(57) ABSTRACT

A control method of a fuel cell vehicle comprises estimating a load applied to an own vehicle that is the fuel cell vehicle and that runs on an estimated route by using current traffic flow information or the like in addition to the estimated route; determining whether an overload area is present on the estimated route by using the estimated load; and when it is determined that the overload area is present on the estimated route, performing an increasing process of increasing a cooling power of a cooling system to be greater than a cooling power set in an ordinary control mode before the own vehicle reaches the overload area.

8 Claims, 13 Drawing Sheets

(51) Int. Cl.
  *H01M 8/04007*  (2016.01)
  *H01M 8/04992*  (2016.01)

(56) References Cited

U.S. PATENT DOCUMENTS

| | | | | |
|---|---|---|---|---|
| 7,588,844 | B2 * | 9/2009 | Hayashi | H01M 8/04223 |
| | | | | 429/429 |
| 8,158,288 | B2 * | 4/2012 | Goebel | H01M 8/04119 |
| | | | | 429/413 |
| 8,232,013 | B2 * | 7/2012 | Igarashi | H01M 8/04097 |
| | | | | 180/65.1 |
| 10,475,980 | B2 * | 11/2019 | Chauvin | G21B 3/00 |
| 2007/0298289 | A1 * | 12/2007 | Clingerman | H01M 8/04228 |
| | | | | 429/429 |
| 2008/0171240 | A1 * | 7/2008 | Ju | H01M 8/04007 |
| | | | | 429/414 |
| 2011/0196554 | A1 * | 8/2011 | Limbeck | H01M 8/04253 |
| | | | | 701/22 |
| 2011/0246004 | A1 * | 10/2011 | Mineta | B60W 20/11 |
| | | | | 701/22 |
| 2011/0313647 | A1 * | 12/2011 | Koebler | B60L 50/62 |
| | | | | 701/123 |
| 2012/0028146 | A1 * | 2/2012 | Lee | H01M 8/04462 |
| | | | | 429/427 |
| 2012/0296505 | A1 * | 11/2012 | Igarashi | B60L 3/0053 |
| | | | | 701/22 |
| 2013/0179007 | A1 * | 7/2013 | Dalum | B60W 10/26 |
| | | | | 701/2 |
| 2015/0099200 | A1 * | 4/2015 | Staley | B60L 58/32 |
| | | | | 429/413 |
| 2015/0298684 | A1 * | 10/2015 | Schwartz | B60W 50/0097 |
| | | | | 701/22 |
| 2016/0240869 | A1 * | 8/2016 | Eschenbach | H01M 8/04029 |
| 2017/0352902 | A1 * | 12/2017 | Ojima | H01M 8/04201 |

FOREIGN PATENT DOCUMENTS

| | | |
|---|---|---|
| JP | 2012-244713 | 12/2012 |
| JP | 2014-002844 A | 1/2014 |
| JP | 2014-228449 A | 12/2014 |
| JP | 2015-205682 A | 11/2015 |

* cited by examiner

FUEL CELL VEHICLE AND CONTROL METHOD THEREOF

CROSS REFERENCE TO RELATED APPLICATION

The present application claims priority from Japanese patent application 2017-030851 filed on Feb. 22, 2017, the entirety of the content of which is hereby incorporated by reference into this application.

BACKGROUND

Field

The present disclosure relates to a fuel cell vehicle and a control method thereof.

Related Art

A fuel cell exerts a sufficient power generation performance in a specific temperature range that is determined according to the properties of an electrolyte layer or the like and generates heat in the course of power generation. A cooling device is thus generally provided inside of the fuel cell to circulate a coolant and thereby control the temperature of the fuel cell during power generation to be in the specific temperature range.

In a vehicle equipped with such a fuel cell as a driving energy source, continuation of a high-load state specifically increases the amount of power generation in the fuel cell. When the temperature of the fuel cell is excessively increased due to continuation of the high-load state, the vehicle generally performs a control of increasing the cooling power of the cooling device. A proposed configuration for this purpose determines whether a fuel cell is kept in a high-temperature, high-load state and, when it is determined that the fuel cell is kept in the high-temperature, high-load state, increases the driving amount of a cooling device (radiator fan or cooling water pump) to increase the cooling power of the cooling device (as described in, for example, JP 2012-209109A).

The fuel cell vehicle described in JP 2012-209109A detects the temperature of the fuel cell and the measurement of a load and determines whether the fuel cell is kept in the high-temperature, high-load state. When it is determined that the fuel cell is kept in the high-temperature, high-load state, the fuel cell vehicle increases the cooling power for cooling down the fuel cell by increasing the speed of the radiator fan or increasing the speed of the cooling water pump. The cooling device mounted on the vehicle, however, has a limited performance. Further continuation of the high-temperature, high-load state is likely to cause insufficient cooling by the cooling device and an excessive temperature rise of the fuel cell. There is accordingly a demand for a technique that suppresses an excessive increase in temperature of the fuel cell even in the case of continuation of a high-load state.

SUMMARY

According to one aspect of the disclosure, there is provided a control method of a fuel cell vehicle equipped with a fuel cell as at least one driving energy source. The fuel cell vehicle comprises a cooling system configured to cool down the fuel cell and a cooling system controller configured to control a cooling power of the cooling system. The cooling system controller has an ordinary control mode as a control mode of controlling the cooling power of the cooling system, wherein the ordinary control mode changes the cooling power of the cooling system to cause a temperature of the fuel cell to be within a predetermined reference temperature range, when it is determined that the temperature of the fuel cell is out of the predetermined reference temperature range, by using at least one of the temperature of the fuel cell, an amount of power generation by the fuel cell and a load request in the fuel cell vehicle. The control method of the fuel cell vehicle comprises estimating a load applied to an own vehicle that is the fuel cell vehicle and that is expected to run on an estimated route, by using at least one of current traffic flow information indicating a current traffic flow on the estimated route, past traffic flow information on the estimated route, a driving history of the own vehicle and a first parameter showing a past driving habit of the own vehicle and indicating a driving tendency of the own vehicle that is different from driving tendencies of other vehicles, in addition to the estimated route where the own vehicle is expected to run; determining whether an overload area that is an area where the temperature of the fuel cell is higher than an appropriate temperature range is present on the estimated route, by using the estimated load; and when determining that the overload area is present on the estimated road, performing an increasing process of increasing the cooling power of the cooling system before the own vehicle reaches the overload area. The increasing process increases the cooling power of the cooling system to be greater than a cooling power set in the ordinary control mode at a time when the increasing process is performed.

DETAILED DESCRIPTION

A. First Embodiment (A-1) General Configuration of Control System

Figure 1:
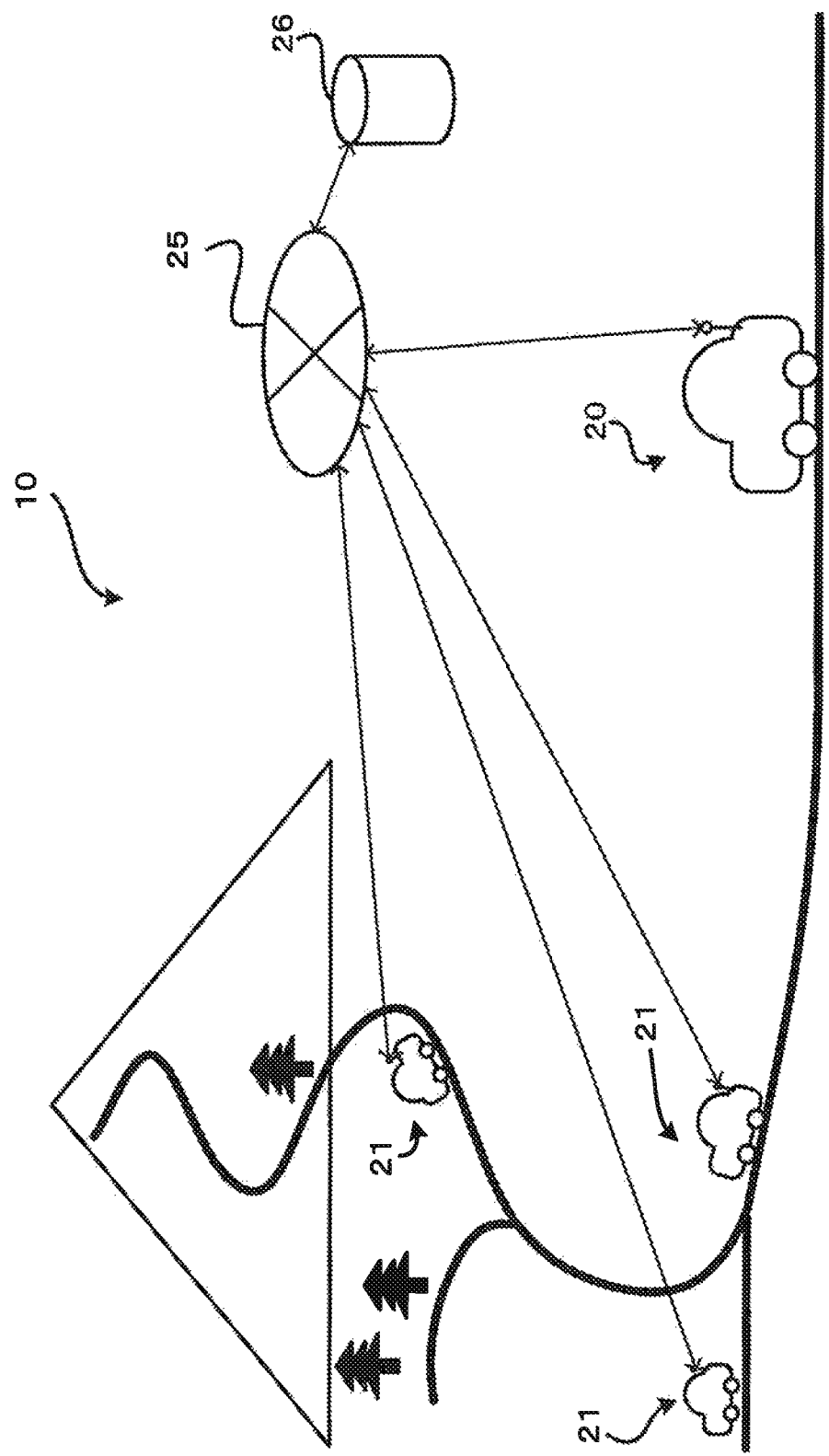
FIG. 1 is a diagram illustrating the schematic configuration of a control system.

FIG. 1 is a diagram illustrating the schematic configuration of a control system 10 according to a first embodiment of the present disclosure. The control system 10 of this embodiment is provided as a control system involved in a cooling system of a fuel cell in a vehicle equipped with the fuel cell as one driving energy source. The control system 10 of the embodiment is provided as a system configured to automatically make communication with individual vehicles so as to collect information regarding the driving conditions (for example, information including positions, vehicle speeds and accelerations of the individual vehicles and navigation information) of the individual vehicles, to derive a load applied to a specific vehicle that travels on an estimated route using the collected information, and to change control of the cooling system of the fuel cell in the specific vehicle. The control system 10 automatically collects information regarding the driving conditions of the vehicles in the entire society or in at least a specific district.

The control system 10 includes a vehicle 20, vehicles 21 and a network 25 that communicates with these vehicles 20 and 21. The network 25 includes a wireless communication network configured to make communication with the vehicle 20 and with the vehicles 21. The network 25 according to the embodiment is formed as a cloud computing system including an external server 26. The external server 26 may be another external server of a different configuration from that of cloud computing, as long as the external server 26 is communicable via a network.

The vehicle 20 is a fuel cell vehicle equipped with a fuel cell as one driving energy source. In the description below, the vehicle 20 is also called own vehicle. The vehicles 21 denote vehicles other than the own vehicle 20 that run in a district where communication with the network 25 is enabled. In the description below, the vehicles 21 are also called the other vehicles 21. The other vehicles 21 may be any of for example, electric vehicles equipped with only a battery as the driving energy source, hybrid vehicles equipped with both a battery and an internal combustion engine, and vehicles equipped with only an internal combustion engine as the driving energy source, in addition to the fuel cell vehicles. The other vehicles 21 may be any vehicles that are communicable with the network 25 to automatically send information regarding the driving conditions of the other vehicles 21 themselves to the network 25. The other vehicles 21 may not be necessarily all the vehicles other than the own vehicle 20 that run in the district where communication with the network 25 is enabled. The higher ratio of the other vehicles 21 configured to communicate with the network 25 to all the running vehicles enhances the accuracy of derivation of an estimated route of the own vehicle 20 described later and the accuracy of derivation of a load applied to the own vehicle 20 when the own vehicle 20 runs on the estimated route. Each of the other vehicles 21 has a similar configuration to that of the own vehicle 20 and may serve as the own vehicle 20 having functions described above. The own vehicle 20 and the other vehicles 21 may be any of, for example, large vehicles such as buses and two-wheel vehicles, in addition to private vehicles.

(A-2) Schematic Configuration of Own Vehicle

Figure 2:
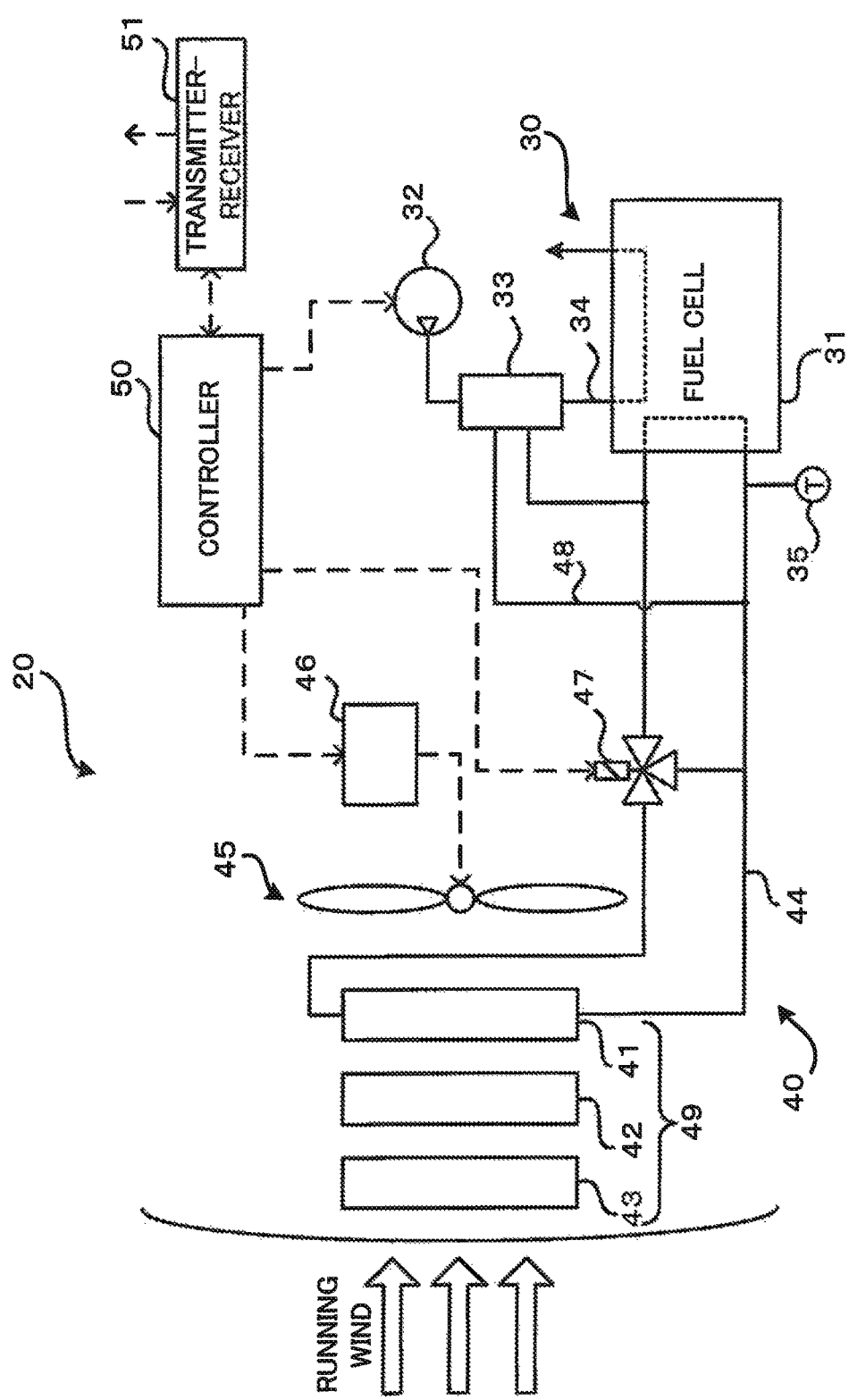
FIG. 2 is a diagram illustrating the schematic configuration of an own vehicle.

FIG. 2 is a diagram illustrating the schematic configuration of the own vehicle 20. The own vehicle 20 is equipped with a fuel cell system 30 including a fuel cell 31. The own vehicle 20 runs with driving a drive motor (not shown) with the fuel cell 31 and electric power (electrical energy) output from a secondary battery (not shown) as the driving energy sources The fuel cell 31 has a stack structure formed by stacking a plurality of unit cells as power generation elements. The fuel cell 31 is a polymer electrolyte fuel cell according to the embodiment but may be another type of fuel cell. Each unit cell includes an electrolyte membrane, and an anode and a cathode as electrodes formed on respective surfaces of the electrolyte membrane. In each unit cell, an in-cell fuel gas flow path that is a flow path of a hydrogen-containing fuel gas is formed on the anode, and an in-cell oxidizing gas flow path that is a flow path of an oxygen-containing oxidizing gas is formed on the cathode. An inter-cell coolant flow path which cooling water as a coolant flows through is formed between adjacent unit cells.

The fuel cell system 30 includes a fuel gas supply portion that includes a hydrogen tank and that is configured to supply the fuel gas to the fuel cell 31. Illustration and detailed description of the fuel gas supply portion are omitted.

The fuel cell system 30 includes an air compressor 32 configured to supply the oxidizing gas to the fuel cell 31. The air compressor 32 is connected with the fuel cell 31 by an oxidizing gas flow path 34. The oxidizing gas supplied through the oxidizing gas flow path 34 to the fuel cell 31 is distributed to the in-cell oxidizing gas flow paths of the respective unit cells to be used for power generation and is then discharged out of the fuel cell 31. The oxidizing gas flow path 34 is provided with a heat exchanger 33. The heat exchanger 33 makes heat exchange of the oxidizing gas (the air) compressed by the air compressor 32 to have an increased temperature with the coolant and thereby cools down the oxidizing gas before being supplied to the fuel cell 31. The heat exchanger 33 is also called intercooler (I/C).

The fuel cell system 30 includes a cooling system 40 configured to cool down the fuel cell 31. The cooling system 40 includes a FC radiator 41, a coolant flow path 44, a coolant which flows through the coolant flow path 44, a cooling fan 45, a fan controller 46 and a valve 47. The cooling system 40 circulates the coolant through the coolant flow path 44 between the fuel cell 31 and the FC radiator 41, so as to cool down the fuel cell 31. The FC radiator 41 uses the running wind flowing in from outside of the vehicle during running of the own vehicle 20 and the cooling fan 45 to cool down the coolant. The fan controller 46 drives and controls the cooling fan 45. In the cooling system 40, a branch flow path 48 is branched off from the coolant flow path 44 and goes through the heat exchanger 33 described above. The cooling system 40 accordingly cools down the fuel cell 31 and also cools the oxidizing gas that is to be supplied to the fuel cell 31. The valve 47 that is a solenoid valve is provided in the coolant flow path 44. The valve 47 serves to regulate the amount of the coolant that goes through the fuel cell 31 and the heat exchanger 33 and the amount of the coolant that bypasses without going through the fuel cell 31 and the heat exchanger 33 out of the coolant cooled down by the FC radiator 41.

During running of the own vehicle 20, the respective components of the cooling system 40 are driven and controlled based on the temperature of the fuel cell 31, such that the temperature of the fuel cell 31 is in a reference temperature range that is a preset temperature range as a control target of temperature of the fuel cell 31. According to the embodiment, a temperature sensor 35 is provided at a location in the coolant flow path 44 that is in the vicinity of the connection with the fuel cell 31 and where the coolant is discharged from the fuel cell 31. In the own vehicle 20, the respective components of the cooling system 40 are driven and controlled using the detected temperature (coolant temperature) of the temperature sensor 35 as the temperature of the fuel cell 31. When the detected temperature of the temperature sensor 35 is higher than the above reference temperature range, the drive control increases the cooling power of the cooling system 40. More specifically, the drive control performs at least one of increasing the driving amount of the cooling fan 45 and increasing the flow rate of the coolant going through the fuel cell 31 by changing over the valve 47. When the detected temperature of the temperature sensor 35 is lower than the above reference temperature range, on the other hand, the drive control decreases the cooling power of the cooling system 40. More specifically, the drive control performs at least one of decreasing the driving amount of the cooling fan 45 and decreasing the flow rate of the coolant going through the fuel cell 31 by changing over the valve 47.

The cooling power of the cooling system 40 may be changed, based on information other than the temperature of the fuel cell 31. More specifically, the cooling power of the cooling system 40 may be changed as described above when it is expected that the temperature of the fuel cell 31 is out of the reference temperature range, using at least one of the temperature of the fuel cell 31, the amount of power generation by the fuel cell 31 and a load request in the own vehicle 20.

A control mode of changing the cooling power of the cooling system 40 such that the temperature of the fuel cell 31 is in the reference temperature range, using at least one of the currently input load request, the current amount of power generation by the fuel cell 31 and the temperature of the fuel cell 31 is hereinafter called ordinary control mode. In the ordinary control mode, the cooling power may be changed in stages. According to the embodiment, a plurality of high-temperature reference values that are lower than an upper limit value of the reference temperature range (hereinafter also called control upper limit value) are set as the criterion temperature for increasing the cooling power. The driving amount of the cooling fan 45 and the opening position of the valve 47 are changed, such as to enhance the effect of increasing the cooling power at the greater high-temperature reference value. A plurality of low-temperature reference values that are higher than a lower limit value of the reference temperature range are set as the criterion temperature for decreasing the cooling power. The driving amount of the cooling fan 45 and the opening position of the valve 47 are changed, such as the enhance the effect of decreasing the cooling power at the smaller low-temperature reference value. In the ordinary control mode employed in the own vehicle 20, when a high load is continuously applied and the temperature of the fuel cell 31 reaches the control upper limit value, the cooling power of the cooling system 40 is changed to the maximum cooling power.

According to the embodiment, the own vehicle 20 also includes an EV radiator 42 and an air conditioner condenser 43 provided at a location near to the FC radiator 41. During running of the own vehicle 20, the running wind flowing into the own vehicle 20 sequentially passes through the air conditioner condenser 43, the EV radiator 42 and the FC radiator 41. Accordingly, the running wind that passes through the air conditioner condenser 43 and the EV radiator 42 to have increased temperature is used in the process of cooling down the coolant that flows through the coolant flow path 44 by the FC radiator 41. The FC radiator 41, the EV radiator 42 and the air conditioner condenser 43 are collectively called heat exchange portion 49. The heat exchange portion 49 is cooled down by the passing wind that is generated in the heat exchange portion 49 by the running wind and the function of the cooling fan 45.

The air conditioner condenser 43 is a device configured to cool down the coolant used for air conditioning of the own vehicle 20. The EV radiator 42 is a device configured to cool down the coolant used for cooling heat generating members included in the fuel cell system 30 of the own vehicle 20. The heat generating members included in the fuel cell system 30 may include at least one of various devices constituting a DC/DC converter configured to boost an output voltage of the fuel cell 31, an inverter used to drive the air compressor 32 and an inverter used to drive a hydrogen pump that serves to supply hydrogen as a fuel gas to the fuel cell 31. The heat generating members that are included in the fuel cell system 30 and that are cooled down by the EV radiator 42 are hereinafter collectively called EV unit. The amount of heat generation of the EV unit cooled down by the EV radiator 42 increases with an increase in amount of heat generation by the fuel cell 31.

The own vehicle 20 further includes a controller 50. The controller 50 includes a CPU, a ROM, a RAM and input/output ports. This controller 50 performs power generation control of the fuel cell system 30, control of an entire power supply apparatus including the fuel cell system 30 and a secondary battery, and control of the respective components of the own vehicle 20. The controller 50 obtains output signals from sensors provided in respective parts of the own vehicle 20 and also obtains information with regard to driving of the vehicle, such as an accelerator position and a vehicle speed. The controller 50 outputs driving signals to respective parts involved in power generation and driving of the own vehicle 20. More specifically, for example, the controller 50 outputs driving signals to the air compressor 32, the valve 47 and the fan controller 46 as shown in FIG. 2. The controller 50 serving the above functions may not necessarily be configured as a single controller. The controller 50 may be comprised of a plurality of controllers, for example, a controller involved in operations of the fuel cell system 30, a controller involved in driving of the own vehicle 20, and a controller involved in controls of vehicle auxiliary machines that are not directly related to driving of the own vehicle 20. The plurality of controllers may be arranged to transmit required information to one another. The controller 50 also serves as a cooling system controller 52 (shown in FIG. 4 described later) that performs controls to enable the ordinary control mode mentioned above, as a control mode of cooling the cooling power of the cooling system 40.

The own vehicle 20 also includes a transmitter-receiver 51. The transmitter-receiver 51 is connected with the controller 50 to transmit various information to and from the controller 50 and is communicable with the network 25. The transmitter-receiver 51 also serves as the acquirer to obtain signals including a signal that indicates the driving conditions of the own vehicle 20 (described later) from the external server 26.

(A-3) Outline of Pre-Cooling Control Process

Figure 3:
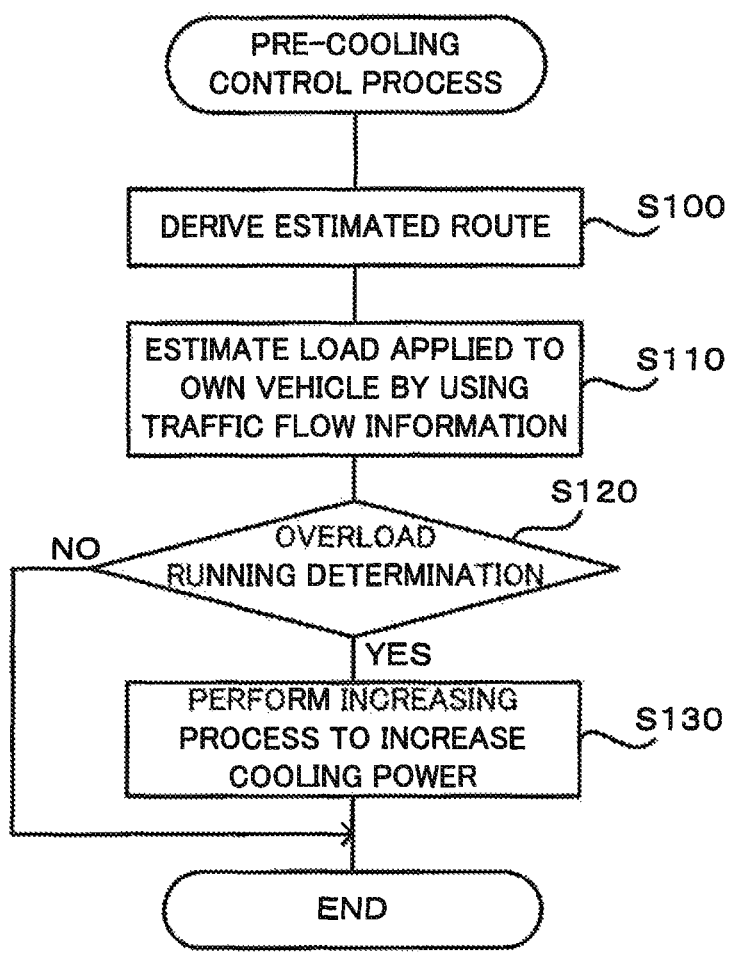
FIG. 3 is a diagram showing the outline of a pre-cooling control process.

FIG. 3 is a diagram showing the outline of a pre-cooling control process performed in the control system 10 according to the embodiment. A part of the respective steps shown in FIG. 3 is performed by the controller 50 of the own vehicle 20, while another part is performed by a processor 60 (described later) that is included in the external server 26

(cloud server) on the network 25. The controller 50 of the own vehicle 20 and the processor 60 of the external server 26 transmit the results of the processes performed by the controller 50 and by the processor 60 to each other via the network 25 and the transmitter-receiver 51. The following first describes the outline of the whole pre-cooling control process performed by the controller 50 and the processor 60 with reference to FIG. 3. In the description below with reference to FIG. 3, the controller 50 of the own vehicle 20 and the processor 60 of the external server 26 are collectively called system processor. The description does not distinguish between the own vehicle 20-side and the external server 26-side as the processing entity of each process.

In the pre-cooling control process, the system processor first derives an estimated route where the own vehicle 20 is expected to run (step S100). The system processor subsequently uses the estimated route and traffic flow information indicating the current traffic flow on the estimated route to estimate a load applied to the own vehicle 20 when the own vehicle 20 runs on the estimated route (step S110). The traffic flow information includes an average vehicle speed and a vehicle speed distribution of the other vehicles 21 that run on the estimated route and that are communicable with the external server 26. At step S110, the system processor uses the traffic flow information to estimate driving conditions of the own vehicle 20 including at least the vehicle speed of the own vehicle 20 that runs on the estimated route, and also uses the estimated driving conditions to estimate a load applied to the own vehicle 20 that runs on the estimated route. The system processor subsequently uses the estimated load applied to the own vehicle 20 to determine whether an overload area where the temperature of the fuel cell 31 is likely to exceed an appropriate temperature range (hereinafter simply called overload area) is present on the estimated route (hereinafter also called overload running determination) (step S120).

More specifically, according to the embodiment, the overload area denotes an area on the estimated route where a load applied to the fuel cell 31 increases and thereby causes the temperature of the fuel cell 31 to exceed a predetermined upper limit value (hereinafter also called FC upper limit temperature Tlim) when the ordinary control mode is employed. The FC upper limit temperature Tlim is a preset temperature which the temperature of the fuel cell 31 is not allowed to exceed, in terms of for example, the durability of the fuel cell 31. According to the embodiment, the upper limit value (control upper limit value) of the reference temperature range used to control the cooling system 40 in the ordinary control mode is set to be lower than this FC upper limit temperature Tlim. In the own vehicle 20, during control of the cooling system 40 in the ordinary control mode, when a high-load state continues and causes the temperature of the fuel cell 31 to reach the upper limit value of the reference temperature range (control upper limit value), the cooling power of the cooling system 40 is maximized as described above. When the high-load state further continues, the temperature of the fuel cell 31 increases above the control upper limit value and is likely to reach the FC upper limit temperature Tlim. At step S120, the system processor uses the estimated load applied to the own vehicle 20 to determine whether there is any overload area where the temperature of the fuel cell 31 exceeds the FC upper limit temperature Tlim as described above.

When it is determined that an overload area is present on the estimated route by the overload running determination at step S120, the system processor performs an increasing process to increase the cooling power of the cooling system 40 before the own vehicle 20 reaches the overload area (step S130) and then terminates the pre-cooling control process. More specifically, the increasing process denotes a process of increasing the cooling power of the cooling system to be greater than the cooling power set in the ordinary control mode at the time when the increasing process is performed. Performing the increasing process to increase the cooling power of the cooling system 40 to be greater than the cooling power set in the ordinary control mode before the own vehicle 20 reaches the overload area is called pre-cooling. The increasing process in the cooling system 40 performs at least one of increasing the driving force of the cooling fan 45 by increasing the driving voltage of the cooling fan 45 and increasing the flow rate of the coolant flowing in the fuel cell 31 by changing the opening position of the valve 47.

When it is determined at step S120 that no overload area is present on the estimated route, the system processor terminates the pre-cooling control process without performing pre-cooling. After performing the increasing process at step S130 or after determining at step S120 that no overload area is present on the estimated route, the system processor returns to step S100 to perform another cycle of the pre-cooling control process.

(A-4) Concrete Operations of Pre-Cooling Control Process

Figure 4:
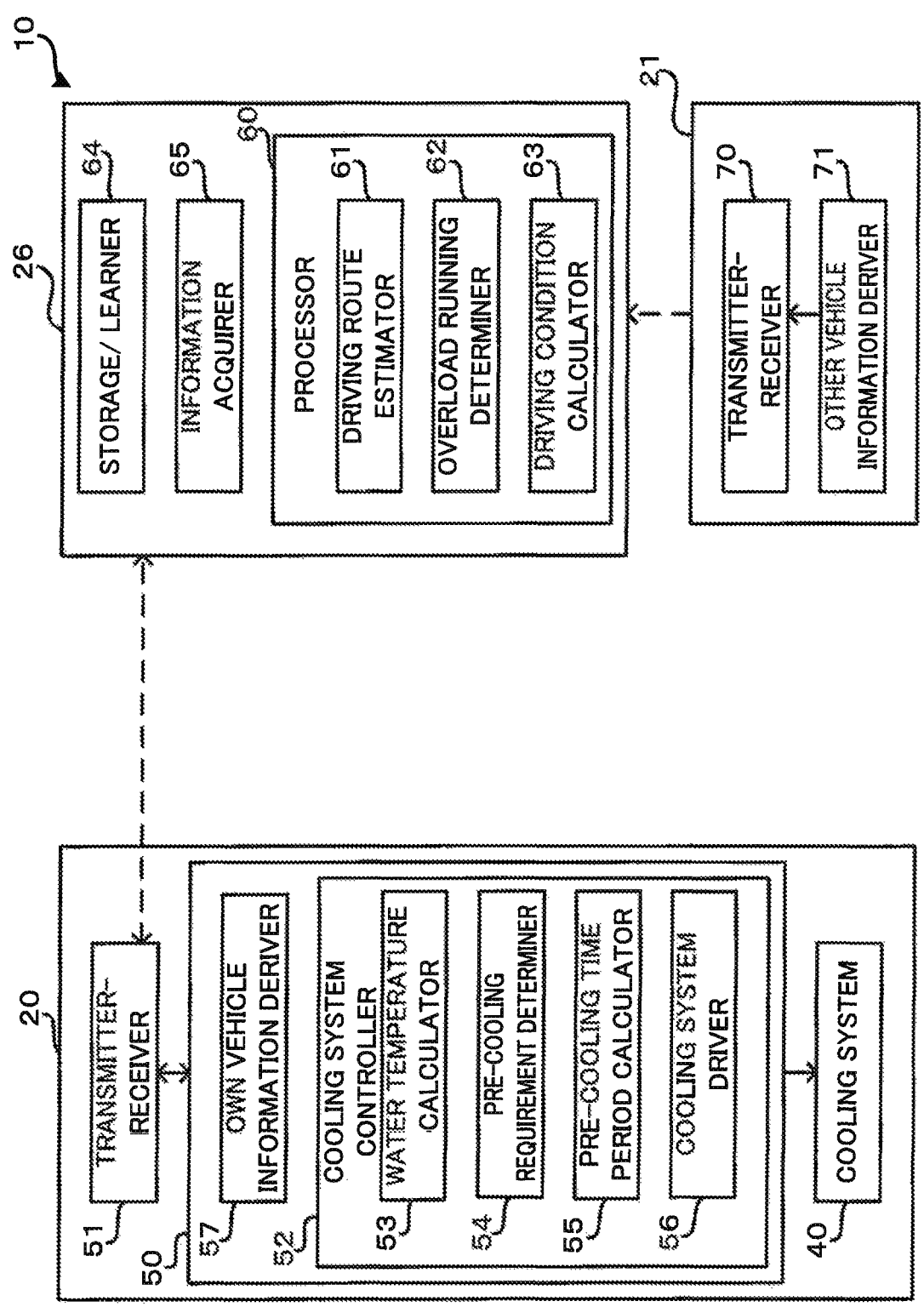
FIG. 4 is a diagram showing functional blocks of the control system.
Figure 5:
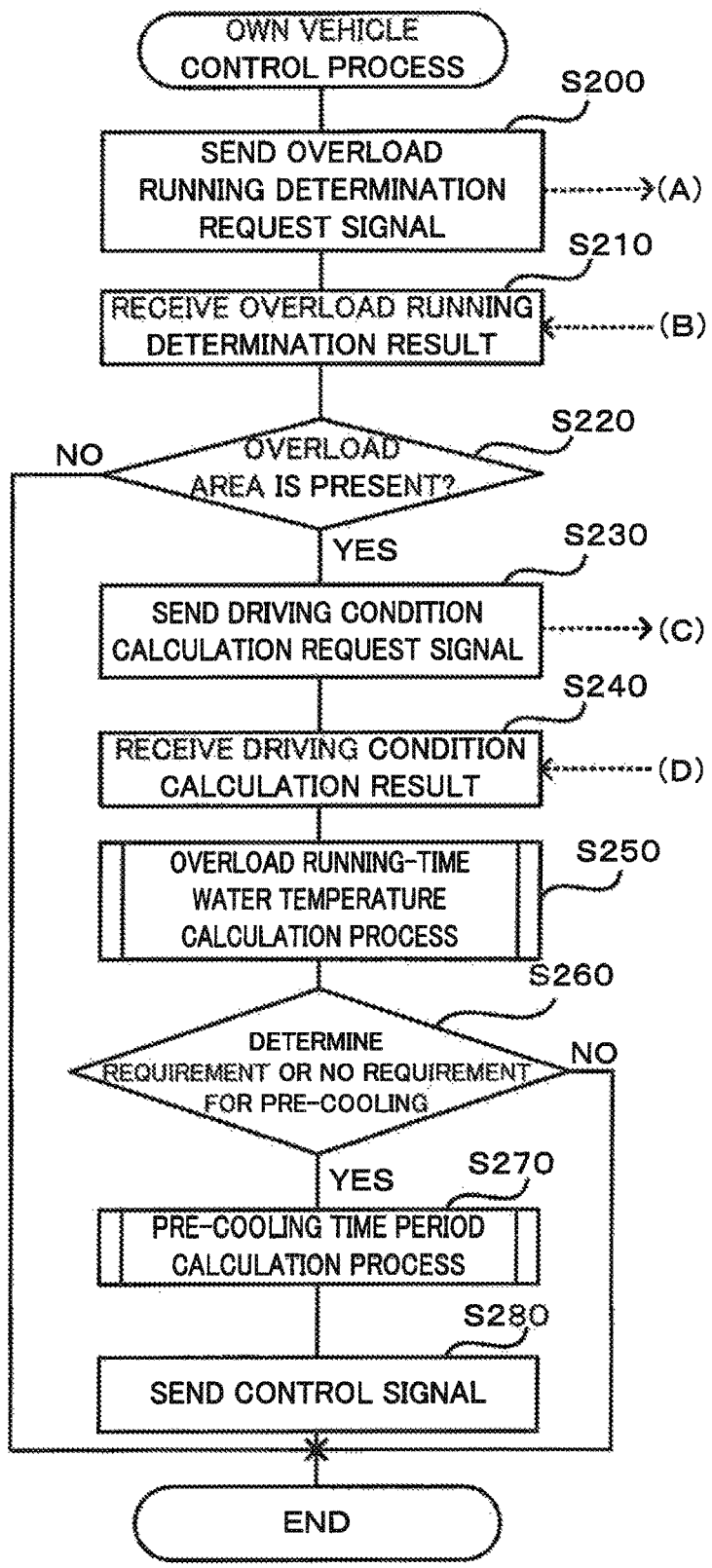
FIG. 5 is a flowchart showing an own vehicle control process routine.
Figure 6:
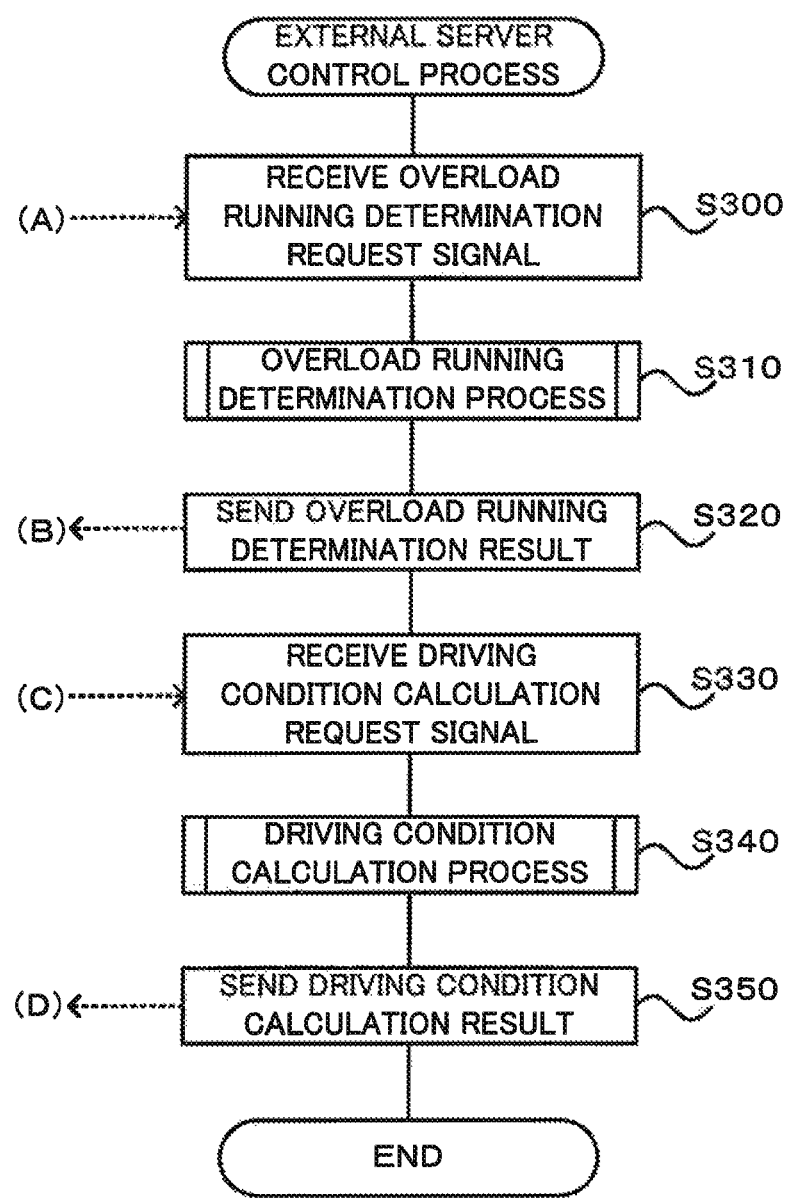
FIG. 6 is a flowchart, showing an external server control process routine.

FIG. 4 is a diagram illustrating functional blocks of the control system 10. FIG. 5 is a flowchart showing an own vehicle control process routine performed by the controller 50 of the own vehicle 20. FIG. 6 is a flowchart showing an external server control process routine performed by the processor 60 of the external server 26. The above description with reference to FIG. 3 does not distinguish between the controller 50 on the own vehicle 20-side and the processor 60 on the external server 26-side as the processing entity of the pre-cooling control process performed in the control system 10. The following concretely describes one example of the pre-cooling control process of FIG. 3 in detail with distinguishing between the process performed by the controller 50 and the process performed by the processor 60.

The functional configuration of the control system 10 is described first with reference to FIG. 4. As shown in FIG. 4 and FIG. 1, the control system 10 includes the own vehicle 20, the other vehicles 21 and the external server 26. The own vehicle 20 includes the controller 50, the transmitter-receiver 51 and the cooling system 40 as described above. The controller 50 of the own vehicle 20 includes an own vehicle information deriver 57 and a cooling system controller 52. The own vehicle information deriver 57 derives information regarding the conditions of the own vehicle 20 (own vehicle information). The own vehicle information may include navigation information of the own vehicle 20 (including destination information input via a navigation derive and a guide route set in the navigation device), the current location of the own vehicle 20, the current vehicle speed of the own vehicle 20, the current acceleration of the own vehicle 20 and the ambient temperature at the current location of the own vehicle 20. The cooling system controller 52 includes a water temperature calculator 53, a pre-cooling requirement determiner 54, a pre-cooling time period calculator 55 and a cooling system driver 56. The own vehicle information deriver 57 and the respective components of the cooling system controller 52 are implemented by the CPU of the controller 50 that reads a program from the ROM and loads and executes the program on the RAM.

Each of the other vehicles 21 includes a controller that is similar to the controller 50 of the own vehicle 20 and that includes an other vehicle information deriver 71. The other vehicle information deriver 71 derives information regarding the conditions of each of the other vehicles 21 (other vehicle information). The other vehicle information may include the current location of each of the other vehicles 21, the current vehicle speed of each of the other vehicles 21, the current acceleration of each of the other vehicles 21 and the ambient temperature at the current location of each of the other vehicles 21. Each of the other vehicles 21 also includes a transmitter-receiver 70 that is communicable with the external server 26. Each of the own vehicle 20 and the other vehicles 21 continuously obtains information regarding the current location as the result of positioning by GPS (global positioning system). Each of the own vehicle 20 and the other vehicles 21 also includes an ambient temperature sensor to continuously detect the ambient temperature.

The external server 26 (cloud server) is configured as a hardware server including a processor, a memory and a network communication function. The memory of the external server 26 includes a storage/learner 64. The processor of the external server 26 includes an information acquirer 65 and a processor 60. The processor 60 includes a driving route estimator 61, an overload running determiner 62 and a driving condition calculator 63.

According to the embodiment, the own vehicle control process routine shown in FIG. 5 is triggered and performed by the controller 50 when a start switch of the own vehicle 20 is turned on. When the own vehicle control process routine is triggered, the controller 50 causes an overload running determination request signal to be sent from the transmitter-receiver 51 to the external server 26 (step S200) as shown by an arrow (A) in FIG. 5. This overload running determination request signal is output to request the external server 26 to perform a series of processing for the overload running determination shown as step S120 of FIG. 3.

The external server control process routine shown in FIG. 6 is triggered by the external server 26, when the external server 26 receives the overload running determination request signal via the network 25 (step S300). When receiving the overload running determination request signal, the external server 26 performs an overload running determination process (step S310).

Figure 7:
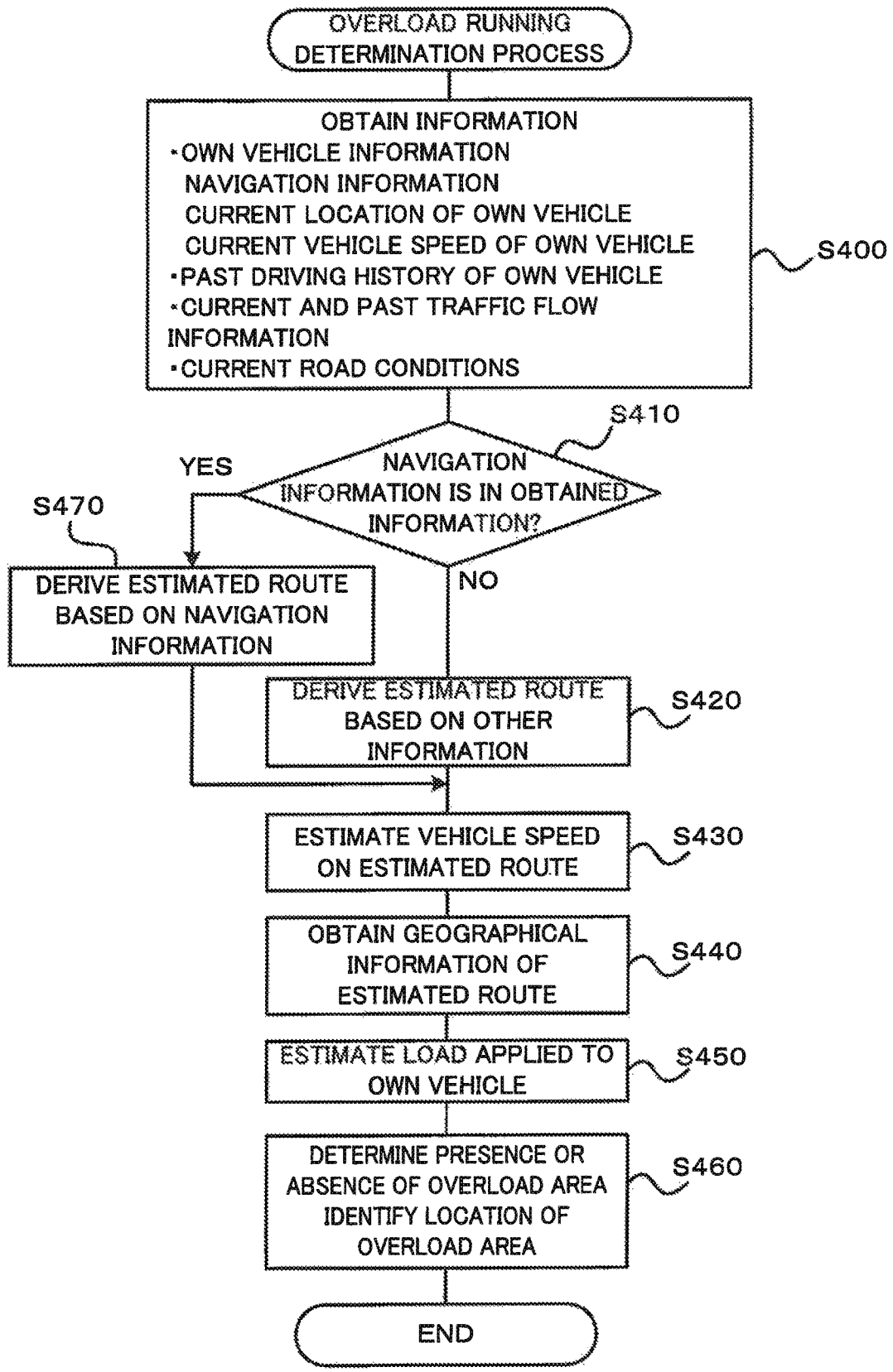
FIG. 7 is a flowchart showing an overload running determination process routine.

FIG. 7 is a flowchart showing a routine of the overload running determination process at step S310. In this routine, the information acquirer 65 of the external server 26 obtains information including own vehicle information and traffic flow information (step S400).

The own vehicle information obtained at step S400 is the own vehicle information that is derived by the own vehicle information deriver 57 of the own vehicle 20 as described above and that is sent to the external server 26 via the transmitter-receiver 51. The own vehicle information may be sent together with the overload running determination request signal at step S200 or may be sent separately from the overload running determination request signal.

The traffic flow information obtained at step S400 includes current traffic flow information and past traffic flow information. The traffic flow information includes an average vehicle speed and a vehicle speed distribution of the other vehicles 21 that are communicable with the external server 26 as described above. The traffic flow information is derived from the other vehicle information that is derived by the other vehicle information deriver 71 of each of the other vehicles 21 communicable with the external server 26 as described above. The other vehicle information of each of the other vehicles 21 is continuously sent from the transmitter-receiver 70 of each of the other vehicles 21 to the external server 26 during running of each of the other vehicles 21. The external server 26 uses the obtained other vehicle information and continuously derives the current traffic flow information. The external server 26 also accumulates and stores the previously derived traffic flow information as past traffic flow information for a certain period of time in the memory of the storage/learner 64, while continuously updating the storage.

The information obtained at step S400 may further include past driving history of the own vehicle 20. The own vehicle 20 continuously sends the own vehicle information including the current location and the vehicle speed to the external server 26 during running of the own vehicle 20. The external server 26 accumulates and stores the obtained own vehicle information for a certain period of time in the memory of the storage/learner 64, while continuously updating the storage. The storage/learner 64 also uses the accumulated own vehicle information and learns and stores the driving history of the own vehicle 20. The driving history of the own vehicle 20 may include, for example, information relating the driving time-of-day in each past driving of the own vehicle 20 to its destination. More specifically, the storage/learner 64 may extract a relationship of the driving time-of-day of the own vehicle 20 to the destination, relate the driving time-of-day to the destination of the high frequency and store the relation as the driving history. The driving history of the own vehicle 20 may also include a change in average vehicle speed to a specific destination in past driving of the own vehicle 20 to the specific destination. At step S400, the driving history of the own vehicle 20 may be obtained from the storage/learner 64.

The information obtained at step S400 may further include information with regard to the current road conditions. The information with regard to the current road conditions may include, for example, information with regard to a blocked district by due to construction work.

After the processing of step S400, the driving route estimator 61 of the external server 26 determines whether navigation information of the own vehicle 20 is included in the information obtained at step S400 (step S410). When it is determined that the navigation information is included in the obtained information, the driving route estimator 61 derives a guide route to an input destination, which is set by the navigation device of the own vehicle 20, as an estimated route of the own vehicle 20 (step S470).

When it is determined at step S410 that the navigation information is not included in the obtained information, on the other hand, the driving route estimator 61 derives an estimated route of the own vehicle 20, based on information other than the navigation information (step S420). More specifically, for example, the driving route estimator 61 may use at least one of the current traffic flow information and the past traffic flow information obtained at step S400 to determine potentials for selection at respective branch points on a driving route of the own vehicle 20, specify a branch destination having the highest potential for selection as a branch destination where the own vehicle 20 is expected to run, and derive an estimated route of the own vehicle 20. For example, a route having the highest rate of selection by the other vehicles 21 may be specified as a route having the highest potential for selection by the own vehicle 20. In another example, when the storage/learner 64 has learnt a specific destination of the high frequency related to the current time or the like and a route to the specific destination, the learnt route may be derived as an estimated route of the own vehicle 20. The driving route estimator 61 may appropriately set priorities to the respective branch points having the potentials for selection and to the respective destinations related to the time-of-day and select a route of the highest priority as an estimated route. When a derived route is currently closed, based on the information with regard to the current road conditions obtained at step S400, the derived route is excluded from the selection of an estimated route.

The driving route estimator 61 may wait for the determination at step S410 until input of the navigation information before the own vehicle 20 starts driving. When a predetermined time period has elapsed since a start of driving of the own vehicle 20 without input of the navigation information or when the own vehicle 20 runs a predetermined distance after a start of driving without input of the navigation information, the driving route estimator 61 may determine that the navigation information is not included in the obtained information and proceed to step S420.

When a route is estimated based on the potentials for selection at the respective branch points derived using the traffic flow information, it is difficult to identify a destination, unlike the route estimation using the navigation information. In this case, the driving route estimator 61 derives a route from the current location of the own vehicle 20 to a predetermined distance (hereinafter also called estimated distance) as an estimated route. The estimated distance may be determined, for example, according to the current vehicle speed. The control of the embodiment performs the pre-cooling before the own vehicle 20 reaches an overload area as described above. The higher current vehicle speed causes the temperature of the fuel cell 31 to rise at the higher rate and causes the own vehicle 20 to reach an overload area at the earlier timing when the overload area is present on the driving route. The embodiment accordingly sets the longer estimated distance of the estimated route with respect to the higher current vehicle speed of the own vehicle 20.

The estimated route derived at step S470 may also be a route to the estimated distance described above, even when a destination is input into the navigation device or when a learnt destination is used, as well as when the traffic flow information is used to derive the estimated route.

The processing of step S420 and the processing of step S470 correspond to step S100 of FIG. 3.

After the derivation of the estimated route, the overload running determiner 62 of the external server 26 estimates a vehicle speed of the own vehicle 20 on the derived estimated route (step S430). According to the embodiment, the current average vehicle speed of the other vehicles 21 on the estimated route is specified as the estimated vehicle speed of the own vehicle 20. The current average vehicle speed of the other vehicles 21 on the estimated route is included in the current traffic flow information obtained at step S400 as described above.

After the processing of step S430, the overload running determiner 62 of the external server 26 obtains geographical information of the estimated route (step S440). According to the embodiment, information including road grades in various districts is stored as geographical information in the memory of the external server 26. At step S440, the overload running determiner 62 obtains geographical information including information regarding road grades from this memory. The information regarding road grades may be stored in a server different from the external server 26 and may be obtained via the network 25.

After the processing of step S440, the overload running determiner 62 of the external server 26 estimates a load applied to the own vehicle 20 (hereinafter also called running load) during running of the own vehicle 20 on the estimated route (step S450). The running load may be thought to be approximately proportional to the vehicle speed and the road grade. At step S450, the overload running determiner 62 accordingly estimates the running load by multiplying the vehicle speed estimated at step S430 by the road grade obtained at step S440. Information affecting the load other than the vehicle speed and the road grade may additionally be used for estimation of the load at step S450. For example, when the geographical information obtained at step S440 includes road surface information (for example, whether or not a rough dirt road that is likely to increase the load), the estimated value of the load may be corrected using the road surface information. The processing of step S450 corresponds to step S110 of FIG. 3.

After the processing of step S450, the overload running determiner 62 of the external server 26 determines whether the estimated route includes any overload area and identifies the location of the overload area if any (step S460) and then terminates this routine. According to the embodiment, the determination with regard to the overload area is performed, based on an integrated running load obtained by integrating the running load estimated at step S450. The processing of step S460 corresponds to the overload running determination of step S120 of FIG. 3.

Figure 8:
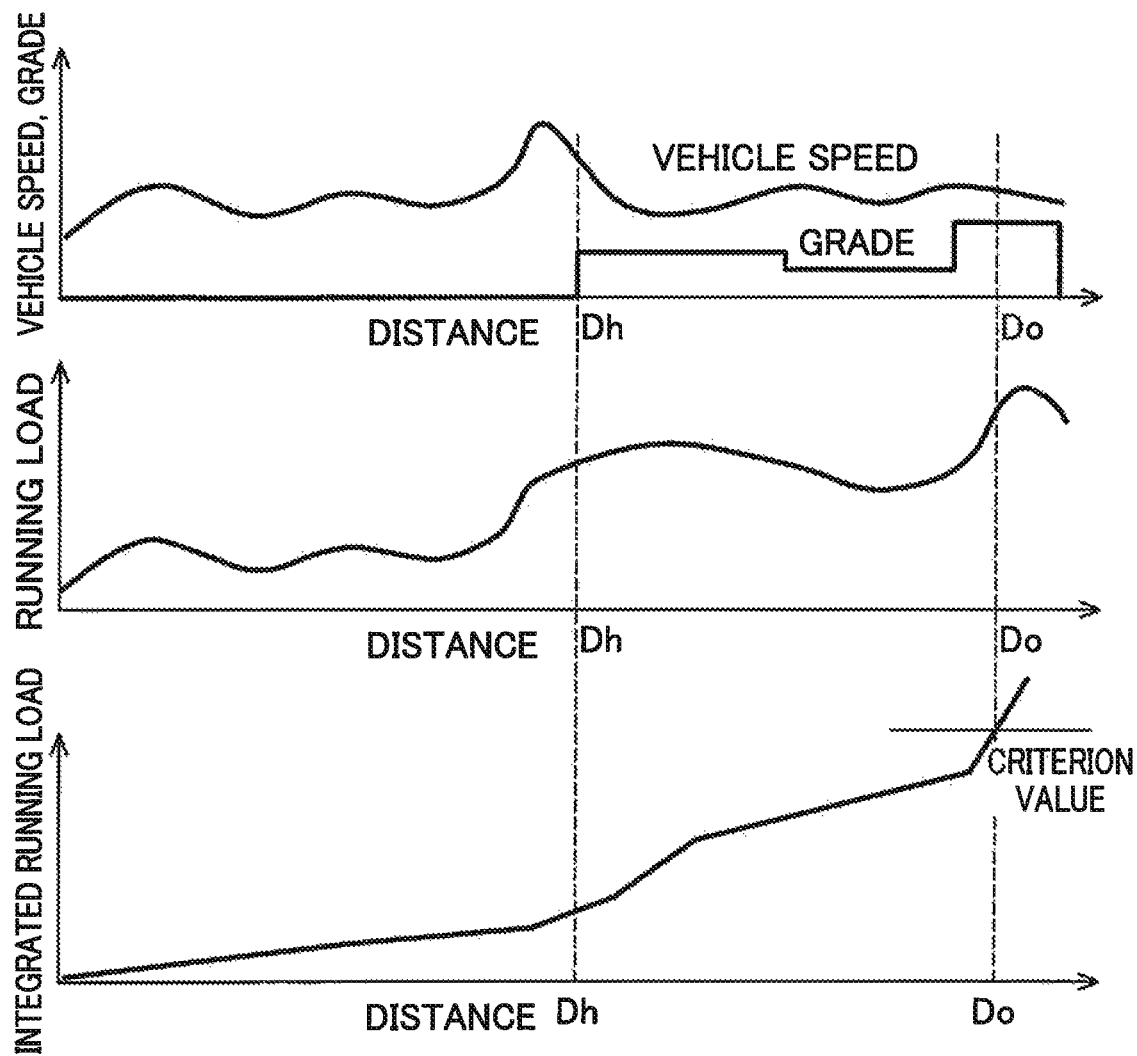
FIG. 8 is a diagram conceptually illustrating the processing by an overload running determiner.

FIG. 8 is a diagram conceptually illustrating the processing by the overload running determiner 62 at steps S430 to S460. The upper graph of FIG. 8 shows the vehicle speed estimated at step S430 and the road grade obtained at step S440. The middle graph of FIG. 8 shows the running load estimated at step S450. The lower graph of FIG. 8 shows the integrated running load obtained by integrating the running load estimated at step S450. The distance from the current location of the own vehicle 20 is commonly used as abscissa in all the upper graph, the middle graph and the lower graph of FIG. 8.

In the illustrated example of FIG. 8, during running of the own vehicle 20 on the estimated route, the road grade abruptly increases at a position of a distance Dh from the current location. According to the embodiment, at the position of the distance Dh, the temperature of the fuel cell 31 increases with an increase in the load and reaches the control upper limit value. This maximizes the cooling power of the cooling system 40. The temperature of the fuel cell 31 keeps increasing while the own vehicle 20 continues running in the area of the large grade. According to the embodiment, at step S460, the overload running determiner 62 determines whether the estimated route includes any overload area and identifies the location of the overload area if any, based on the integrated running load shown in the lower graph of FIG. 8. More specifically, a value of the integrated running load when the temperature of the fuel cell 31 is more likely to reach the FC upper limit temperature Tlim is set in advance as a criterion value of the integrated running load. When the integrated running load is expected to reach this criterion value during running of the own vehicle 20 on the estimated route, it is determined that the estimated route includes an overload area. A distance Do when the integrated running load reaches the criterion value is specified as the position of the overload area.

On termination of the overload running determination process of step S310, the external server 26 sends an overload running determination result obtained at step S310 to the own vehicle 20 (step S320) as shown by an arrow (B) in FIG. 6.

As shown in FIG. 5, when the transmitter-receiver 51 of the own vehicle 20 receives the above overload running determination result (step S210), the controller 50 of the own vehicle 20 determines whether any overload area is present on the estimated route, based on the received overload running determination result (step S220). When it is determined that no overload area is present on the estimated route, the controller 50 terminates the own vehicle control process routine.

When it is determined that an overload area is present on the estimated route, on the other hand, the controller 50 of the own vehicle 20 causes a driving condition calculation request signal to be sent from the transmitter-receiver 51 to the external server 26 (step S230) as shown by an arrow (C) in FIG. 5.

As shown in FIG. 6, when the external server 26 receives the driving condition calculation request signal (step S330), the driving condition calculator 63 of the external server 26 performs a driving condition calculation process (step S340).

Figure 9:
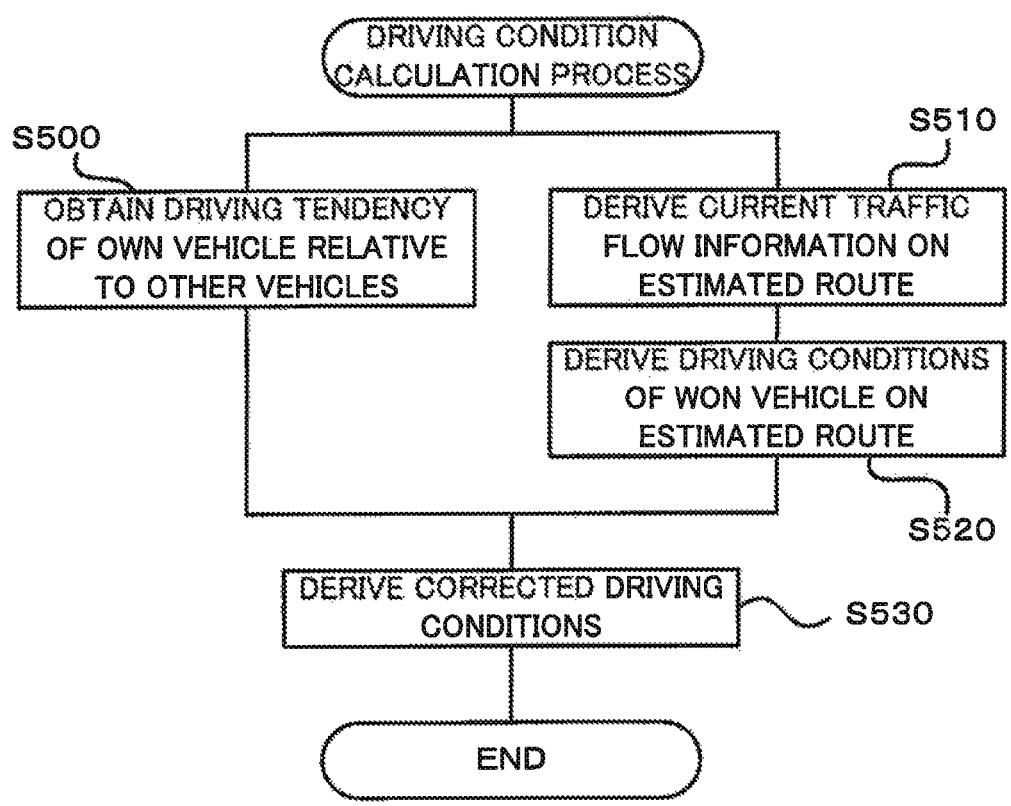
FIG. 9 is a flowchart showing a driving condition calculation process routine.

FIG. 9 is a flowchart showing a routine of the driving condition calculation process at step S340. In this routine, the driving condition calculator 63 of the external server 26 first obtains a past driving tendency (habit in driving) of the own vehicle 20 relative to the other vehicles 21 (step S500) from the storage/learner 64.

The past driving tendency of the own vehicle 20 is a parameter indicating a different tendency from those of the other vehicles 21 during running of the own vehicle 20. The external server 26 continuously receives the own vehicle information sent from the own vehicle 20 and the other vehicle information sent from each of the other vehicles 21 as described above. The received information is accumulated and stored for a certain period of time in the storage/learner 64 of the external server 26, while the storage is continuously updated. The driving tendency of the own vehicle 20 derived from the own vehicle information and the other vehicle information is continually extracted and is stored as a learning result in the storage/learner 64. The driving tendency of the own vehicle 20 may include, for example, an average rate of the vehicle speed of the own vehicle 20 to the average vehicle speed of the other vehicles 21 that run in the same district and an average rate of the acceleration of the own vehicle 20 to the average acceleration of the other vehicles 21 that run in the same district. The driving tendency of the own vehicle 20 may also include the maximum speed of the own vehicle 20 that runs in a specific district (for example, a general road or an expressway).

The driving condition calculator 63 of the external server 26 also derives current traffic flow information on the estimated route (step S510). The current traffic flow information on the estimated route is derived using the other vehicle information received from each of the other vehicles 21 that run on the estimated route. The driving condition calculator 63 subsequently derives the driving conditions of the own vehicle 20 on the estimated route by using the derived traffic flow information (step S520). The driving conditions of the own vehicle 20 derived at step S520 include at least a change in estimated running load of the own vehicle 20 that runs on the estimated route (variation pattern of the expected load when the own vehicle 20 runs on the estimated route). According to the embodiment, the driving conditions of the own vehicle 20 also include a change in estimated vehicle speed of the own vehicle 20 that runs on the estimated route (variation pattern of the expected vehicle speed when the own vehicle 20 runs on the estimated route) and the ambient temperature on the estimated route.

The estimated vehicle speed of the own vehicle 20 derived at step S520 is the current average vehicle speed (included in the current traffic flow information) of the other vehicles 21 that run on the estimated route and is derived on the assumption that the own vehicle 20 runs at the average vehicle speed of the other vehicles 21 that run in the vicinity of the own vehicle 20. The estimated running load of the own vehicle 20 derived at step S520 is derived by multiplying the above estimated vehicle speed by the road grade on the estimated route included in the geographical information stored in the memory of the external server 26. The ambient temperature on the estimated route derived at step S520 is extracted from the other vehicle information which the external server 26 obtains from the other vehicles 21 that run on the estimated route.

The driving condition calculator 63 subsequently corrects the driving conditions of the own vehicle 20 derived at step S520 using the driving tendency of the own vehicle 20 obtained at step S500 (step S530) and then terminates the driving condition calculation process routine. More specifically, for example, the driving condition calculator 63 may correct the estimated vehicle speed of the own vehicle 20 derived at step S520 by multiplying the estimated vehicle speed by the average rate of the vehicle speed of the own vehicle 20 to the average vehicle speed of the other vehicles 21 that run on the same district. In another example, the driving condition calculator 63 may correct the estimated vehicle speed of the own vehicle 20 derived at step S520 with setting the maximum speed of the own vehicle 20 that runs on the specific district as described above, as the upper limit.

The driving conditions of the own vehicle 20 derived by the driving condition calculation process routine of FIG. 9 may include, for example, information regarding a variety of factors that affect the load applied to the own vehicle 20 that runs on the estimated route (hereinafter also called load varying information). For example, information regarding the use state of an air conditioner of the own vehicle 20 relative to the ambient temperature (what degree of air conditioning at what ambient temperature) (hereinafter also called own vehicle air conditioning information) may be included in the own vehicle information that is accumulated in the storage/learner 64 of the external server 26. The driving condition calculator 63 may estimate the use state of the air conditioner of the own vehicle 20 that runs on the estimated route by using the above own vehicle air conditioning information and the ambient temperature on the estimated route and may include a result of this estimation in the driving conditions of the own vehicle 20 that are derived at step S520.

On termination of the driving condition calculation process of step S340, the external server 26 sends a driving condition calculation result obtained at step S340 (also called a signal indicating the driving conditions of the own vehicle 20) to the own vehicle 20 (step S350) as shown by an arrow (D) in FIG. 6 and then terminates the external server control process routine.

As shown in FIG. 5, when the transmitter-receiver 51 of the own vehicle 20 receives the above driving condition calculation result (step S240), the controller 50 of the own vehicle 20 performs an overload running-time water temperature calculation process using the received driving condition calculation result (step S250).

Figure 10:
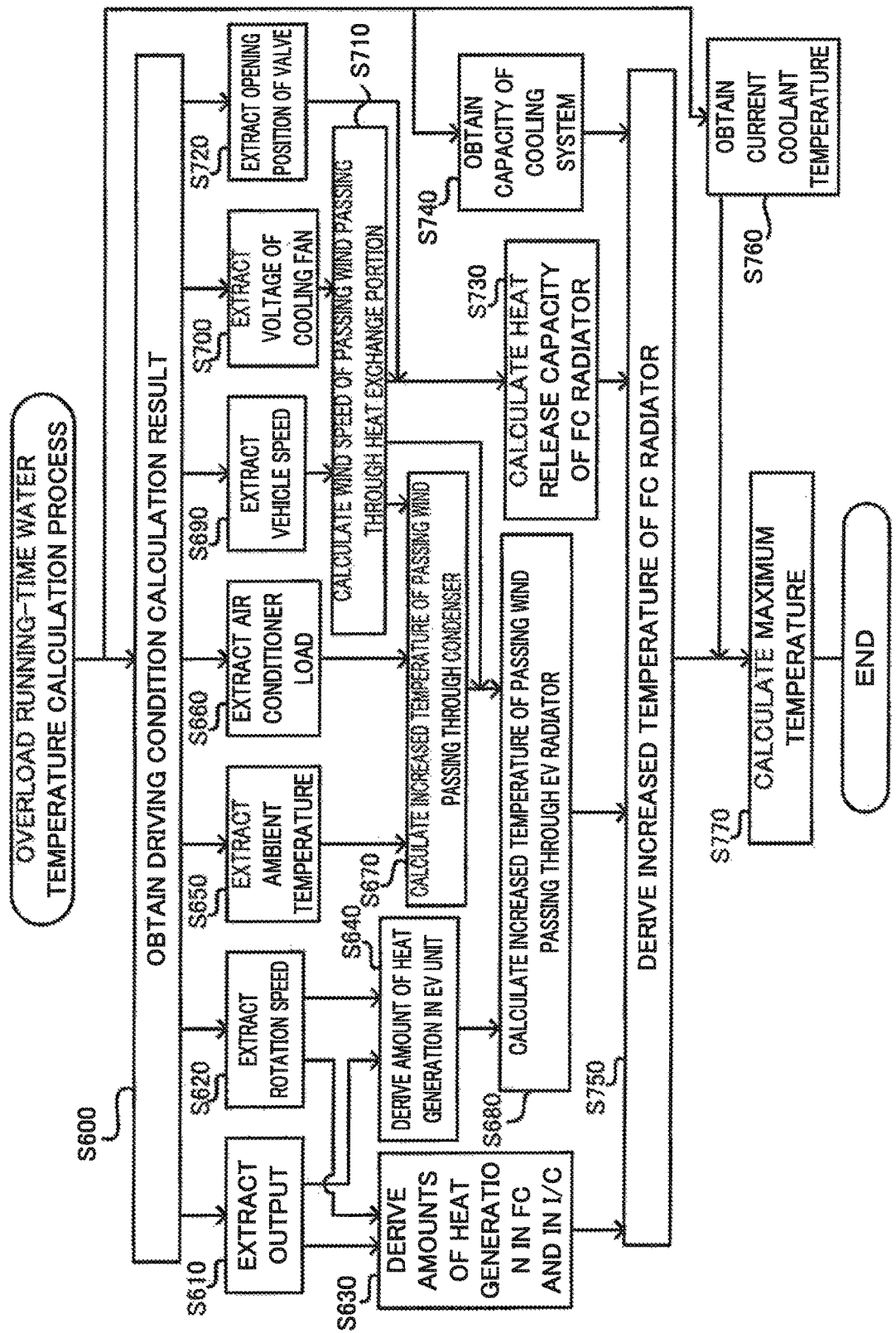
FIG. 10 is a flowchart showing an overload running-time water temperature calculation process routine.

FIG. 10 is a flowchart showing a routine of the overload running-time water temperature calculation process at step S250. This routine is performed by the water temperature calculator 53 of the controller 50 of the own vehicle 20 (shown in FIG. 4). In the overload running-time water temperature calculation process routine, the water temperature calculator 53 first obtains the driving condition calculation result received at step S240 (step S600). The water temperature calculator 53 subsequently uses the obtained driving condition calculation result to extract a change in output of the fuel cell 31 (step S610), to extract a change in rotation speed of the air compressor 32 of the own vehicle 20 (step S620), to extract a change in ambient temperature on the estimated route (step S650), to extract a change in air conditioner load of the own vehicle 20 that runs on the estimated route (step S660), to extract a change in estimated vehicle speed of the own vehicle 20 that runs on the estimated route (step S690), to extract a change in driving voltage of the cooling fan 45 when the own vehicle 20 runs on the estimated route (step S700) and to extract a change in opening position of the valve 47 when the own vehicle 20 runs on the estimated route (step S720).

In the own vehicle 20, a relationship between a load request and output of the fuel cell 31 and a relationship between output of the fuel cell 31 and rotation speed of the air compressor 32 are determined in advance. The change in output of the fuel cell 31 extracted at step S610 and the change in rotation speed of the air compressor 32 extracted at step S620 are determined as expected variation patterns when the own vehicle 20 runs on the estimated route, by using the estimated running load of the own vehicle 20 on the estimated route, which is included in the driving condition calculation result. The change in ambient temperature extracted at step S650 and the change in estimated vehicle speed of the own vehicle 20 extracted at step S690 are included in the driving condition calculation result received at step S240. The change in air conditioner load extracted at step S660 is derived by using the estimation result of the use state of the air conditioner of the own vehicle 20 running on the estimated route, which is included in the driving condition calculation result. In the own vehicle 20, the driving voltage of the cooling fan 45 and the opening position of the valve 47 in the cooling system 40 are set according to the amount of power generation (output) of the fuel cell 31, the vehicle speed of the own vehicle 20 and the ambient temperature. Accordingly, the change in driving voltage of the cooling fan 45 extracted at step S700 and the change in opening position of the valve 47 extracted at step S720 are derived by using the estimated running load of the own vehicle 20 on the estimated routine, the vehicle speed of the own vehicle 20 and the ambient temperature, which are included in the driving condition calculation result.

The water temperature calculator 53 subsequently uses the change in output of the fuel cell 31 extracted at step S610 to derive a change in amount of heat generation in the fuel cell 31, and uses the change in rotation speed of the air compressor 32 extracted at step S620 to derive a change in amount of heat generation in the heat exchanger 33 (step S630). The amount of heat generation in the fuel cell 31 and the amount of heat generation in the heat exchanger 33 are included in a first temperature rise amount by which the temperature of the coolant is increased due to power generation of the fuel cell 31.

The water temperature calculator 53 also uses the change in output of the fuel cell 31 extracted at step S610 and the change in rotation speed of the air compressor 32 extracted at step S620 to derive a change in amount of heat generation in the EV unit (step S640). The EV unit denotes a heat generation member that is included in the fuel cell system 30 and that is cooled down by the EV radiator 42 as described above. The amount of heat generation in the EV unit increases with an increase in amount of heat generation in the fuel cell 31. According to the embodiment, the EV unit includes an inverter provided to drive the air compressor 32. The change in amount of heat generation in the EV unit may thus be derived as described above. The amount of heat generation in the EV unit is included in the first temperature rise amount by which the temperature of the coolant increases due to power generation of the fuel cell 31.

The water temperature calculator 53 uses the change in vehicle speed extracted at step S690 and the change in driving voltage of the cooling fan 45 extracted at step S700 to calculate a change in wind speed of the passing wind that passes through the heat exchange portion 49 (step S710). The strength of the running wind flowing toward the heat exchange portion 49 may be calculated from the vehicle speed of the own vehicle 20. The strength of the flow of the air in the heat exchange portion 49 by the cooling fan 45 may be calculated from the driving voltage of the cooling fan 45. The wind speed of the passing wind may thus be derived by summing up the strength of the running wind and the strength of the flow of the air described above.

The water temperature calculator 53 uses the change in ambient temperature (step S650), the change in air conditioner load (step S660) and the change in wind speed of the passing wind passing through the heat exchange portion 49 (step S710) to calculate a change in increased temperature of the passing wind that passes through the air conditioner condenser 43 (step S670). A change in temperature of the coolant for cooling down the air conditioner that flows into the air conditioner condenser 43 may be derived from the change in air conditioner load (step S660). A heat exchange efficiency (heat release capacity) of the air conditioner condenser 43 varies with the wind speed of the passing wind that passes through the air conditioner condenser 43 (step S710) and the ambient temperature (step S650). According to the embodiment, the controller 50 stores in advance a map that uses the ambient temperature, the air conditioner load and the wind speed of the passing wind passing through the heat exchange portion 49 as parameters to derive the degree of a temperature rise of the passing wind that passes through the air conditioner condenser 43. At step S670, the water temperature calculator 53 refers to this map to derive a change in increased temperature of the passing wind that passes through the air conditioner condenser 43. The calculation of step S670 is on the assumption of a fixed flow rate of the coolant for cooling down the air conditioner that passes through the air conditioner condenser 43. The increased temperature of the passing wind that passes through the air conditioner condenser 43 is included in a second temperature rise amount by which the coolant temperature is increased due to a factor other than power generation of the fuel cell 31.

The water temperature calculator 53 subsequently uses the change in amount of heat generation in the EV unit (step S640), the change in increased temperature of the passing wind that passes through the air conditioner condenser 43 (step S670) and the change in wind speed of the passing wind passing through the heat exchange portion 49 (step S710) to calculate a change in increased temperature of the passing wind that passes through the EV radiator 42 located on the downstream side of the air conditioner condenser 43 in the flow direction of the passing wind (step S680). A change in temperature of the coolant for cooling down the EV unit that flows into the EV radiator 42 may be derived from the change in amount of heat generation in the EV unit (step S640). A heat exchange efficiency (heat release capacity) of the EV radiator 42 varies with the wind speed of the passing wind that passes through the EV radiator 42 (wind speed of the passing wind passing through the heat exchange portion 49) and the temperature of the passing wind that passes through the EV radiator 42. The temperature of the passing wind that passes through the EV radiator 42 may be calculated using the ambient temperature and the increased temperature of the passing wind passing through the air conditioner condenser 43 that is calculated at step S670. According to the embodiment, the controller 50 stores in advance a map that uses the temperature of the passing wind that passes through the EV radiator 42, the amount of heat generation in the EV unit and the wind speed of the passing wind that passes through the EV radiator 42 as parameters to derive the degree of a temperature rise of the passing wind that passes through the EV radiator 42. At step S680, the water temperature calculator 53 refers to this map to derive a change in increased temperature of the passing wind that passes through the EV radiator 42. The calculation of step S680 is on the assumption of a fixed flow rate of the coolant for cooling down the EV unit that passes through the EV radiator 42.

The water temperature calculator 53 uses the change in wind speed of the passing wind passing through the heat exchange portion 49 (step S710) and the change in opening position of the valve 47 (step S720) to calculate a change in heat release capacity of the FC radiator 41 located on the downstream side of the EV radiator 42 in the flow direction of the passing wind (step S730). A flow rate of the coolant that passes through the FC radiator 41 is determined by the opening position of the valve 47. The heat release capacity of the FC radiator 41 varies with the wind speed of the passing wind that passes through the FC radiator 41 and the flow rate of the coolant that flows in the FC radiator 41. According to the embodiment, the controller 50 stores in advance a map that uses the wind speed of the passing wind that passes through the FC radiator 41 and the opening position of the valve 47 as parameters to derive the heat release capacity of the FC radiator 41. At step S730, the water temperature calculator 53 refers to this map to derive a change in heat release capacity of the FC radiator 41.

The water temperature calculator 53 subsequently derives a change in increased temperature of the coolant that passes through the FC radiator 41 (step S750). More specifically, the water temperature calculator 53 uses the changes in amounts of heat generation in the fuel cell 31 and in the heat exchanger 33 (step S630), the change in increased temperature of the passing wind that passes through the EV radiator 42 (step S680), the change in heat release capacity of the FC radiator 41 (step S730) and the capacity of the cooling system 40 to derive a change in increased temperature at step S750. The capacity of the cooling system denotes a total amount of the coolant flowing in the cooling system 40 and is stored in the memory of the controller 50. The water temperature calculator 53 obtains the capacity of the cooling system from the memory at step S740.

A change in increased temperature of the coolant that flows into the FC radiator 41 may be derived from the changes in amounts of heat generation in the fuel cell 31 and in the heat exchanger 33 (step S630). A heat exchange power of the FC radiator 41 may be determined by using a temperature difference between the temperature of the coolant that is to be cooled and the temperature of the passing wind that is used for cooling and the heat release capacity of the FC radiator 41 that is derived from the wind speed of the passing wind and the flow rate of the coolant. According to the embodiment, the controller 50 stores in advance a map that uses the amounts of heat generation in the fuel cell 31 and in the heat exchanger 33 (step S630), the increased temperature of the passing wind that passes through the EV radiator 42 (step S680) and the heat release capacity of the FC radiator 41 (step S730) as parameters to derive the degree of a temperature rise of the coolant that passes through the FC radiator 41. At step S750, the water temperature calculator 53 refers to this map to derive a change in increased temperature of the coolant that passes through the FC radiator 41. The change in increased temperature of the coolant derived at step S750 may be regarded as a change in increased temperature of the fuel cell 31.

Along with the processing of step S750, the water temperature calculator 53 obtains a current coolant temperature $T_0$ in the cooling system 40 (step S760). The current coolant temperature $T_0$ may be obtained from a detection signal of the temperature sensor 35 provided in the cooling system 40 (shown in FIG. 2).

After the processing of step S750, the water temperature calculator 53 uses the change in increased temperature of the coolant that passes through the FC radiator 41 (step S750) and the current coolant temperature $T_0$ (step S760) to calculate a change in coolant temperature in the cooling system 40 and a maximum temperature Tmax of the coolant (step S770) and then terminates the overload running-time water temperature calculation process routine. At step S770, the water temperature calculator 53 may determine a change in coolant temperature in the cooling system 40 from the present time by multiplying the change in increased temperature of the coolant that passes through the FC radiator 41 (step S750) by the current coolant temperature $T_0$ in the cooling system 40. A maximum temperature which the coolant temperature reaches (maximum temperature Tmax) may be determined from the change in coolant temperature in the cooling system 40. The coolant temperature in the cooling system 40 determined as described above corresponds to the temperature of the fuel cell 31. The maximum temperature Tmax may thus be regarded as a maximum temperature which the fuel cell 31 reaches when the own vehicle 20 runs on the estimated route in the ordinary control. At step S770, the water temperature calculator 53 derives, along with the maximum temperature Tmax, a maximum temperature reaching time tmax that denotes the time when the coolant temperature reaches the maximum temperature Tmax when the own vehicle 20 runs on the estimated route in the ordinary control.

Referring back to FIG. 5, on termination of the overload running-time water temperature calculation process (step S250), the pre-cooling requirement determiner 54 of the controller 50 (shown in FIG. 4) determines a requirement or no requirement for pre-cooling (step S260). When the maximum temperature Tmax calculated at step S770 of FIG. 10 is higher than the FC upper limit temperature Tlim described above, the pre-cooling requirement determiner 54 determines a requirement for pre-cooling. When the maximum temperature Tmax is equal to or lower than the FC upper limit temperature Tlim, on the other hand, the pre-cooling requirement determiner 54 determines no requirement for pre-cooling.

When no requirement for pre-cooling is determined at step S260, the controller 50 terminates the own vehicle control process routine. When a requirement for pre-cooling is determined at step S260, on the other hand, the controller 50 performs a pre-cooling time period calculation process (step S270).

Figure 11:
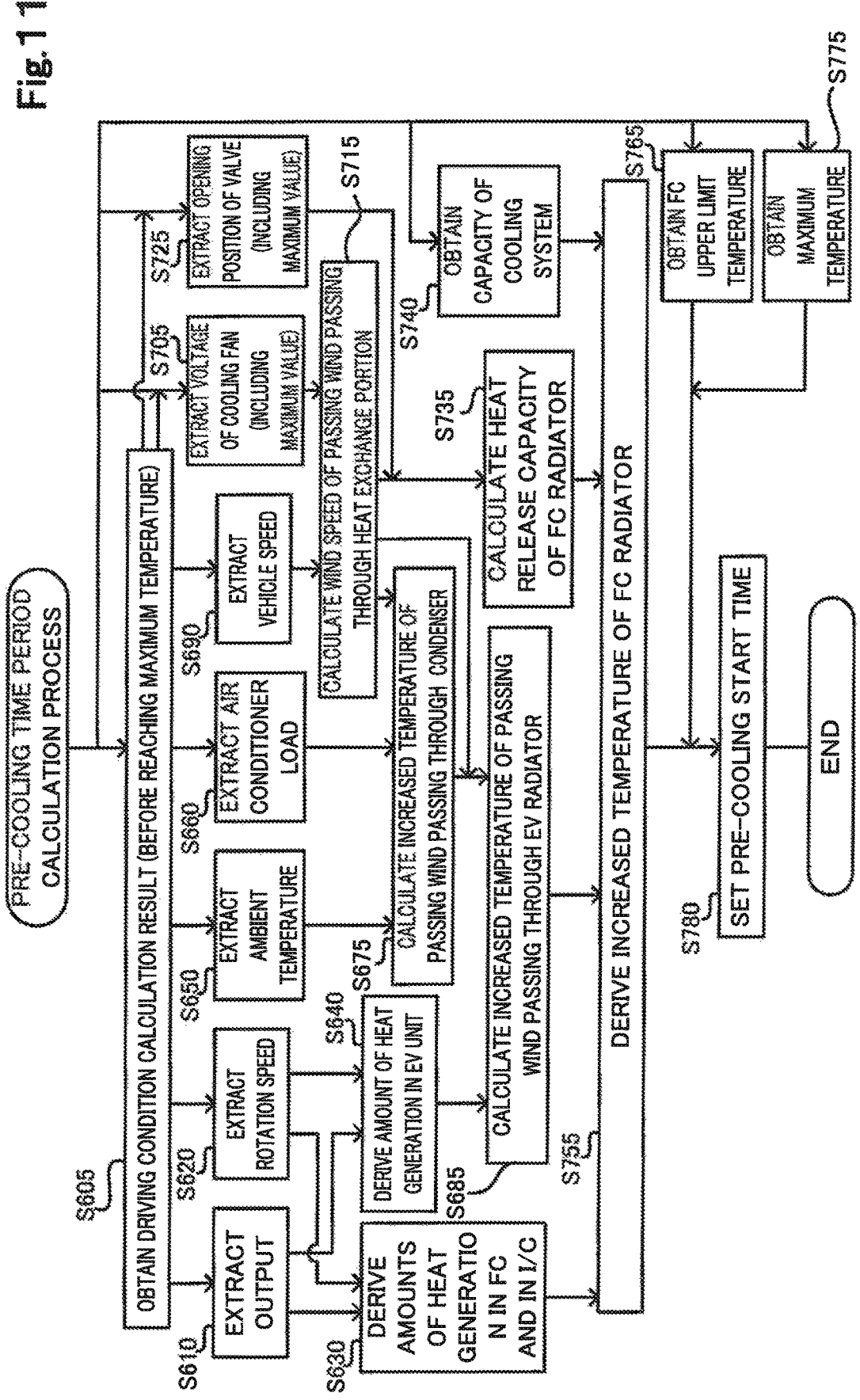
FIG. 11 is a flowchart showing a pre-cooling time period calculation process routine.

FIG. 11 is a flowchart showing a routine of the pre-cooling time period calculation process at step S270. This routine is performed by the pre-cooling time period calculator 55 of the controller 50 of the own vehicle 20 (shown in FIG. 4). In the pre-cooling time period calculation process routine of FIG. 11, the steps common with those in the overload running-time water temperature calculation process routine of FIG. 10 are expressed by the same step numbers, and their detailed description is omitted.

In the pre-cooling time period calculation process routine, the pre-cooling time period calculator 55 first obtains the driving condition calculation result received at step S240 (step S605). Step S605 is similar to step S600 of FIG. 10 but differs from step S600 by obtaining the driving condition calculation result up to the maximum temperature reaching time tmax that denotes the time when the coolant temperature reaches the maximum temperature Tmax when the own vehicle 20 runs on the estimated route in the ordinary control. The maximum temperature reaching time tmax is derived at step S770 as described above. At each of subsequent steps of FIG. 11 described below, the processing similar to the processing of FIG. 10 is performed for a time period up to the maximum temperature reaching time tmax.

The pre-cooling time period calculator 55 subsequently uses the driving condition calculation result obtained at step S605 to extract a change in output of the fuel cell 31 (step S610), to extract a change in rotation speed of the air compressor 32 of the own vehicle 20 (step S620), to extract a change in ambient temperature on the estimated route (step S650), to extract a change in air conditioner load of the own vehicle 20 that runs on the estimated route (step S660) and to extract a change in estimated vehicle speed of the own vehicle 20 that runs on the estimated route (step S690) similarly to FIG. 10. The pre-cooling time period calculator 55 then derives a change in amount of heat generation in the fuel cell 31 and a change in amount of heat generation in the heat exchanger 33 (step S630) and derives a change in amount of heat generation in the EV unit that is cooled down by the EV radiator 42 (step S640) like the overload running-time water temperature calculation process routine of FIG. 10.

The pre-cooling time period calculator 55 also uses the driving condition calculation result obtained at step S605 to extract a change in driving voltage of the cooling fan 45 (step S705) and to extract a change in opening position of the valve 47 (step S725). At step S705, the pre-cooling time period calculator 55 uses the driving condition calculation result obtained at step S605 to extract a change in driving voltage of the cooling fan 45 when the own vehicle 20 runs on the estimated route in the ordinary control mode like step S700 of FIG. 10 and additionally obtains a voltage of the cooling fan 45 when the cooling power of the cooling system 40 reaches the maximum (maximum value of the voltage of the cooling fan 45). At step S725, the pre-cooling time period calculator 55 uses the driving condition calculation result obtained at step S605 to extract a change in opening position of the valve 47 when the own vehicle 20 runs on the estimated route in the ordinary control mode like step S720 of FIG. 10 and additionally obtains an opening position of the valve 47 when the cooling power of the cooling system 40 reaches the maximum (maximum value of the opening position of the valve 47).

The pre-cooling time period calculator 55 subsequently uses the change in vehicle speed extracted at step S690 and the change in driving voltage of the cooling fan 45 extracted at step S705 to calculate a change in wind speed of the passing wind that passes through the heat exchange portion 49 (step S715) like step S710 of FIG. 10. At step S705, the pre-cooling time period calculator 55 obtains the maximum value of the voltage of the cooling fan 45, along with extracting the change in driving voltage of the cooling fan 45 when the own vehicle 20 runs on the estimated route in the ordinary control mode as described above. When the own vehicle 20 runs in the ordinary control mode, the cooling power of the cooling system 40 reaches the maximum at a time prior to the maximum temperature reaching time tmax (at a time of the distance Dh shown in FIG. 8). A region where the cooling power of the cooling system 40 reaches the maximum during running of the own vehicle 20 in the ordinary control mode is hereinafter called maximum cooling region. A maximum cooling start time (time period required to reach the maximum cooling region from the present time) during running of the own vehicle 20 in the ordinary control mode is hereinafter called time period th. At step S715, the pre-cooling time period calculator 55 calculates a change in wind speed of the passing wind that passes through the heat exchange portion 49 when the cooling power of the cooling system 40 is maximized (when the voltage of the cooling fan 45 and the opening position of the valve 47 are maximized) to perform pre-cooling, prior to elapse of the time period th.

More specifically, the embodiment uses a set minimum unit of time ti when the cooling power of the cooling system 40 is maximized to effectively decrease the temperature of the coolant that passes through the FC radiator 41 (temperature of the fuel cell 31). At step S715, the pre-cooling time period calculator 55 calculates the change in wind speed of the passing wind that passes through the heat exchange portion 49 with regard to a plurality of patterns that advance the timing when the cooling power is maximized, for example, by maximizing the cooling power at an earlier timing by a time t1 prior to elapse of the time period th, by maximizing the cooling power at an earlier timing by a time $2ti$, and by maximizing the cooling power at an earlier timing by a time $3ti$. The number of the patterns that advance the timing when the cooling power is maximized may be a specific value set in advance to determine the timing of pre-cooling or may be set arbitrarily according to the current vehicle speed and the like. The plurality of patterns that advance the timing when the cooling power of the cooling system 40 is maximized (to start pre-cooling) by going back from the time period th by each time ti are hereinafter collectively called reverse pattern group.

The pre-cooling time period calculator 55 uses the change in ambient temperature (step S650), the change in air conditioner load (step S660) and the change in wind speed of the passing wind passing through the heat exchange portion 49 (step S715) to calculate a change in increased temperature of the passing wind that passes through the air conditioner condenser 43 (step S675) like step S670 of FIG. 10. The change in wind speed of the passing wind passing through the heat exchange portion 49 is calculated with regard to the reverse pattern group at step S715, so that the change in increased temperature of the passing wind passing through the air conditioner condenser 43 is also calculated with regard to the reverse pattern group at step S675.

The pre-cooling time period calculator 55 subsequently uses the change in amount of heat generation in the EV unit (step S640), the change in increased temperature of the passing wind passing through the air conditioner condenser 43 (step S675) and the change in wind speed of the passing wind passing through the heat exchange portion 49 (step S715) to calculate a change in increased temperature of the passing wind that passes through the EV radiator 42 located on the downstream side of the air conditioner condenser 43 in the flow direction of the passing wind (step S685) like step S680 of FIG. 10. The change in increased temperature of the passing wind passing through the air conditioner condenser 43 (step S675) and the change in wind speed of the passing wind passing through the heat exchange portion 49 (step S715) are both calculated with regard to the reverse pattern group, so that the change in increased temperature of the passing wind passing through the EV radiator 42 is calculated with regard to the reverse pattern group at step S685.

The pre-cooling time period calculator 55 also uses the change in wind speed of the passing wind passing through the heat exchange portion 49 (step S715) and the change in opening position of the valve 47 (step S725) to calculate a change in heat release capacity of the FC radiator 41 located on the downstream side of the EV radiator 42 in the flow direction of the passing wind (step S735) like step S730 of FIG. 10. The change in wind speed of the passing wind passing through the heat exchange portion 49 is calculated (step S715) with regard to the reverse pattern group. At step S725, the pre-cooling time period calculator 55 obtains the maximum value of the opening position of the valve 47, along with extracting the change in opening position of the valve 47 during running of the own vehicle 20 on the estimated route in the ordinary control mode. At step S735, the pre-cooling time period calculator 55 accordingly calculates the change in heat release capacity of the FC radiator 41 with regard to the reverse pattern group.

The pre-cooling time period calculator 55 subsequently derives a change in increased temperature of the coolant that passes through the FC radiator 41 (step S755). More specifically, the pre-cooling time period calculator 55 uses the changes in amounts of heat generation in the fuel cell 31 and in the heat exchanger 33 (step S630), the change in increased temperature of the passing wind that passes through the EV radiator 42 (step S685), the change in heat release capacity of the FC radiator 41 (step S735) and the capacity of the cooling system (step S740) to derive the increased temperature of the coolant at step S755 like step S750. The change in increased temperature of the passing wind passing through the EV radiator 42 (step S685) and the change in heat release capacity of the FC radiator 41 (step S735) are both calculated with regard to the reverse pattern group, so that the change in increased temperature of the coolant that passes through the FC radiator 41 is derived with regard to the reverse pattern group at step S755.

At step S755, the pre-cooling time period calculator 55 derives the change in increased temperature of the coolant that passes through the FC radiator 41 with regard to the reverse pattern group and additionally derives a maximum value of the increased temperature of the coolant with regard to each timing when the cooling power of the cooling system 40 is maximized (to start pre-cooling).

Figure 12:
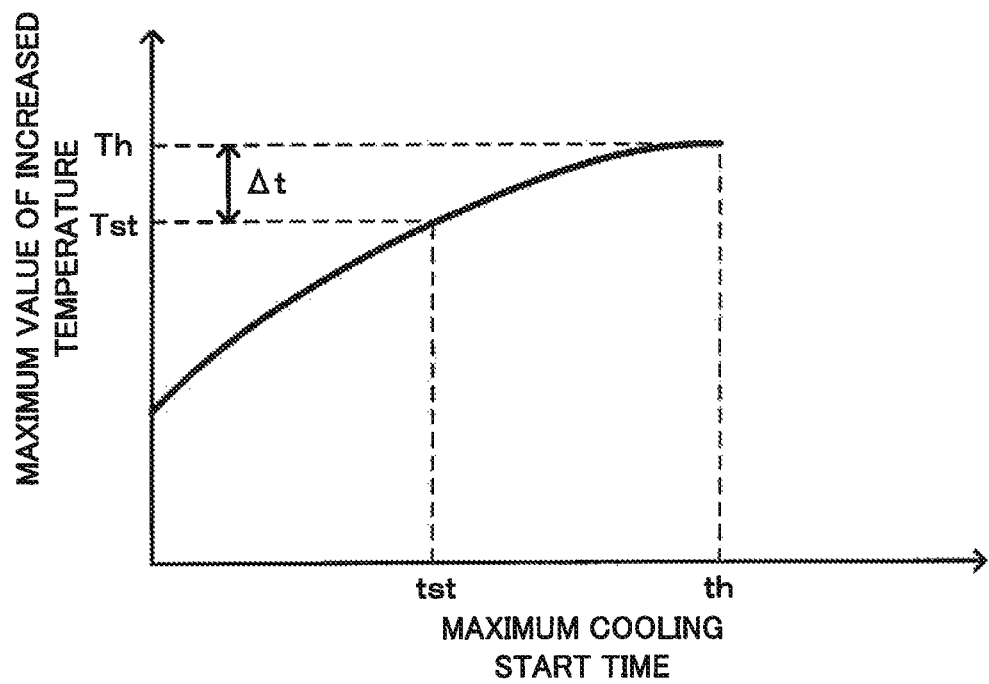
FIG. 12 is a diagram showing a relationship of a maximum cooling start time to a maximum value of increased temperature.

FIG. 12 is a diagram conceptually showing a relationship of the time period elapsed from the present time to the time when the cooling power of the cooling system 40 is maximized (hereinafter called maximum cooling start time) to the maximum value of the increased temperature of the coolant. FIG. 12 shows the maximum cooling start time as abscissa and the maximum value of the increased temperature of the coolant as ordinate. The maximum cooling start time is equal to the time period th when the control is performed only in the ordinary control mode without pre-cooling as described above. Starting the maximum cooling at the earlier timing, i.e., starting the pre-cooling at the earlier timing, provides the smaller maximum value of the increased temperature of the coolant. In the example of FIG. 12, the maximum value of the increased temperature of the coolant without pre-cooling is an increased temperature Th.

Along with the processing of step S755, the pre-cooling time period calculator 55 obtains the preset FC upper limit temperature Tlim described above (step S765) and also obtains the maximum temperature Tmax of the coolant in the ordinary control mode calculated at step S770 of FIG. 10 8step S775).

After the processing of step S755, the pre-cooling time period calculator 55 uses the relationship of the maximum cooling start time to the maximum value of the increased temperature of the coolant shown in FIG. 12 (step S755), the FC upper limit temperature Tlim (step S765) and the maximum temperature Tmax of the coolant in the ordinary control mode (step S775) to set a pre-cooling start time (step S780) and then terminates this routine.

More specifically, the pre-cooling time period calculator 55 performs the following series of processing at step S780. Calculating a difference between the maximum temperature Tmax and the FC upper limit temperature Tlim determines a degree to decrease the maximum value of the increased temperature of the coolant by pre-cooling. The difference between the maximum temperature Tmax and the FC upper limit temperature Tlim is hereinafter called decreased temperature $\Delta t$ (as shown in FIG. 12). The pre-cooling time period calculator 55 refers to the relationship of the maximum cooling start time to the maximum value of the increased temperature of the coolant shown in FIG. 12 and determines the maximum cooling start time (time period tst) when the maximum value of the increased temperature of the coolant becomes equal to a temperature Tst that is lower by the decreased temperature $\Delta t$ than the temperature Th that is the maximum value of the increased temperature without pre-cooling. This time period tst indicates the pre-cooling start time to be set at step S780.

Referring back to FIG. 5, on termination of the pre-cooling time period calculation process routine (step S270), the cooling system driver 56 of the controller 50 outputs driving signals to the cooling system 40 (step S280) and then terminates the own vehicle control process routine. At step S280, the cooling system driver 56 outputs driving signals to the respective components of the cooling system 40 to start pre-cooling at the pre-cooling start time tst set at step S270. The processing of step S280 corresponds to step S130 of FIG. 3.

When the series of processing for pre-cooling shown in FIGS. 5 to 7 and FIGS. 9 to 11 is performed in the control system 10, the controller 50 of the own vehicle 20 compares the current location of the own vehicle 20 with the estimated route separately from the series of processing for pre-cooling after the estimated route is derived at step S420 of FIG. 7. When the current location of the own vehicle 20 is deviated from the estimated route, the control for pre-cooling is cancelled. More specifically, when a distance between the current location of the own vehicle 20 and the estimated route is equal to or greater than a predetermined reference distance or when a time period since deviation of the current location of the own vehicle 20 from the estimated route is equal to or longer than a predetermined reference time, an interrupt process is performed to stop the above series of processing for pre-cooling. When the processing on the own vehicle 20-side in the processing for pre-cooling is stopped on determination that the own vehicle 20 is deviated from the estimated route, the own vehicle 20 sends a cancellation signal to the external server 26 to stop the processing on the external server 26-side. In the case where the processing for pre-cooling is cancelled in the middle of the processing, the processing for pre-cooling is restarted to newly derive an estimated route.

When it is determined that an overload area is present on the estimated route of the own vehicle 20, the control system 10 of the embodiment having the configuration described above performs the increasing process to increase the cooling power of the cooling system 40 to be greater than the cooling power set in the ordinary control mode, before the own vehicle 20 reaches the overload area. This configuration suppresses an excessive increase in temperature of the fuel cell 31. More specifically, this configuration suppresses the temperature of the fuel cell 31 from reaching the FC upper limit temperature Tlim.

According to the embodiment, the upper limit value of the reference temperature range (control upper limit value) that is the control target of the temperature of the fuel cell 31 is set such that the temperature of the fuel cell 31 is less likely to reach the control upper limit value in the ordinary expected driving conditions. The maximum cooling power of the cooling system 40 is set such that the temperature of the fuel cell 31 is less likely to reach the FC upper limit temperature Tlim by maximizing the cooling power of the cooling system 40 even when the temperature of the fuel cell 31 reaches the control upper limit value. When the own vehicle 20 runs in the ordinary control mode in the case of continuation of high-load running as in the case of a long uphill road, however, the temperature of the fuel cell 31 is likely to keep increasing even after the temperature of the fuel cell 31 reaches the control upper limit value and the cooling power of the cooling system 40 reaches the maximum. In this case, the temperature of the fuel cell 31 may become excessively high to exceed an appropriate temperature range and thereby cause a failure of the control to decrease the temperature of the fuel cell 31. The temperature of the fuel cell 31 becoming excessively high to exceed the appropriate temperature range may result in decreasing the output of the fuel cell 31. The cooling power of the cooling system 40 that has reached the maximum cooling power is not allowed to increase beyond the maximum cooling power. For example, there may be accordingly a need to limit the amount of power generation of the fuel cell 31 (output of the own vehicle 20), in order to suppress reduction of durability due to an excessive temperature rise of the fuel cell 31.

According to the embodiment, the control system 10 determines in advance whether an overload area is present on the estimated route and performs pre-cooling, before the own vehicle 20 reaches the overload area and the maximum cooling region. This configuration suppresses an excessive temperature rise of the fuel cell 31 due to insufficiency of the cooling power of the cooling system 40. This configuration also reduces the necessity of setting the output limit of the fuel cell 31 due to an excessive temperature rise of the fuel cell 31 and thereby improves the drivability of the own vehicle 20. Additionally, this does not require the cooling system 40 of the own vehicle 20 to have the excessive cooling power responding to a maximum excess load with a view to ensuring the drivability and thereby simplifies the configuration of the cooling system 40.

More specifically, according to the embodiment, the cooling power of the cooling system 40 is maximized in the pre-cooling that enhances the cooling power of the cooling system 40 to be higher than that in the ordinary control mode. Maximizing the cooling power in the pre-cooling responds to a greater load or a continuous high load and thereby enhances the reliability of the control to reduce the temperature of the fuel cell 31. The pre-cooling is required to increase the cooling power to be higher than the cooling power in the ordinary control mode before the cooling power of the cooling system 40 reaches the maximum in the ordinary control mode. The pre-cooling may thus increase the cooling power of the cooling system 40 to a lower cooling power than the maximum cooling power of the cooling system 40.

According to the embodiment, the control system 10 derives the difference $\Delta t$ between the maximum temperature Tmax (maximum temperature which the fuel cell 31 reaches during running on the estimated route in the ordinary control) and the FC upper limit temperature Tlim, in the control of enhancing the cooling power of the cooling system 40 described above. The control system 10 determines the maximum cooling start time tst (required time to reach the maximum cooling region from the present time) that is the timing to start pre-cooling, such as to provide the difference $\Delta t$ between the maximum value of the increased temperature of the coolant without pre-cooling (increased temperature Th) and the maximum value of the increased temperature of the coolant with pre-cooling (as shown in FIG. 12). This configuration ensures the control of decreasing the coolant temperature (temperature of the fuel cell 31) to or below the FC upper limit temperature Tlim even when the own vehicle 20 runs in the overload area.

Figure 13:
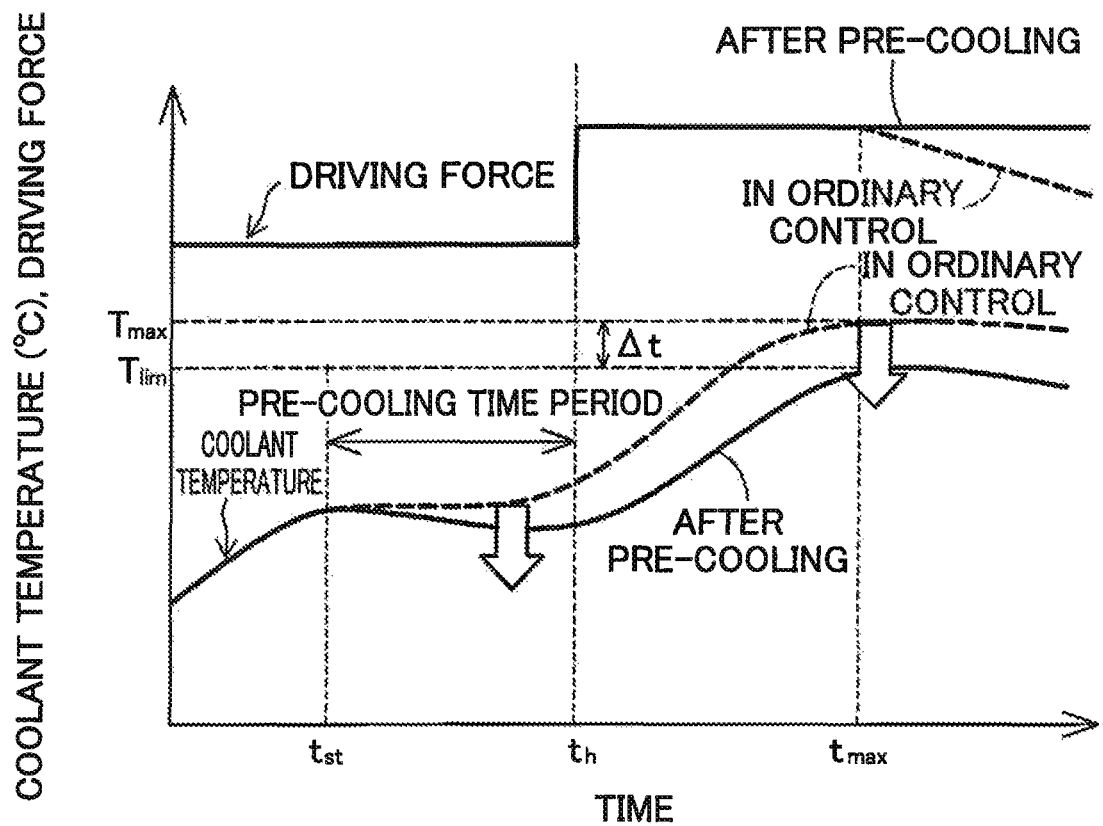
FIG. 13 is a diagram illustrating the effect of pre-cooling.

FIG. 13 is a diagram schematically illustrating the effect of pre-cooling to decrease the temperature of the fuel cell 31 to or below the FC upper limit temperature Tlim. FIG. 13 shows a change in driving force of the own vehicle 20 (corresponding to the amount of power generation by the fuel cell 31) and a change in coolant temperature of the cooling system 40 (temperature of the fuel cell 31) with the elapsed time since the present time as abscissa. In FIG. 13, changes (in estimated driving force and in estimated coolant temperature) when the own vehicle 20 runs on the estimated route in the ordinary control mode are shown by the broken line, and changes (in driving force after pre-cooling and in coolant temperature after pre-cooling) when pre-cooling is performed during running on the estimated route are shown by the solid line.

In the example of FIG. 13, the driving force of the own vehicle 20 abruptly increases due to a start of climbing on an uphill road or the like after elapse of the time period th. The cooling power of the cooling system 40 becomes maximum after the time period th in the case of running in the ordinary control mode. In the case of running in the ordinary control mode, the coolant temperature increases after the time period th and reaches the maximum temperature Tmax at the maximum temperature reaching time tmax. The area after the coolant temperature reaches the maximum temperature Tmax corresponds to the overload area described above.

When pre-cooling is started at the pre-cooling start time tst set in the pre-cooling time period calculation process routine, on the other hand, this reduces the degree of increase in coolant temperature after the time tst. This accordingly reduces the maximum temperature of the coolant at the time tmax to the FC upper limit temperature Tlim.

According to the embodiment, the control system 10 determines the pre-cooling time period such as to reduce the maximum value of the increased temperature of the coolant to be lower by the value $\Delta t$ than the increased temperature Th without pre-cooling (as shown in FIG. 12). Accordingly, the coolant temperature after pre-cooling is the FC upper limit temperature Tlim. According to a modification, in order to further decrease the coolant temperature after pre-cooling, a longer time period may be set to the pre-cooling time period (to start pre-cooling at the earlier timing) by taking into account a response of control and the like.

According to the embodiment, the control system 10 uses the information including at least one of the current traffic flow information and the past traffic flow information to specify the branch destination having the highest potential for selection at a branch point on the driving route of the own vehicle 20, as the branch destination where the own vehicle 20 runs. The control system 10 also derives the estimated route by using the learning result of the driving history of the own vehicle 20. Even when there is no entry of a destination in the navigation device of the own vehicle 20, this configuration enables the estimated route of the own vehicle 20 to be derived with high accuracy.

According to the embodiment, in the control for precooling, the control system 10 uses the driving conditions including the estimated vehicle speed of the own vehicle 20 to estimate the output of the fuel cell 31 (step S610). The vehicle speed of the own vehicle 20 is estimated by using the current traffic flow information on the estimated route (step S510). The vehicle speed of the own vehicle 20 is corrected (step S530) by using the learning result with regard to the driving tendency of the own vehicle 20 relative to the other vehicles 21 in the vicinity of the own vehicle 20 (step S500). This configuration enhances the accuracy of estimation of the output of the fuel cell 31 and thereby enhances the reliability of the control to suppress an excessive temperature rise of the fuel cell 31 by pre-cooling. A modification may not perform the correction using the learning result with regard to the driving tendency of the own vehicle 20 relative to the other vehicles 21 in the vicinity of the own vehicle 20.

According to the embodiment, the control system 10 estimates the load applied to the own vehicle 20 that runs on the estimated route (step S450) and determines whether an overload area is present on the estimated route by using the estimated load (step S460). When it is determined that an overload area is present on the estimated route, the control system 10 derives the maximum temperature Tmax that is the maximum temperature which the coolant temperature reaches in the ordinary control mode (step S770) by using the first temperature rise amount (steps S630 and S640), the second temperature rise amount (step S670) and the heat release capacity of the FC radiator 41 (step S730). The control system 10 also compares the maximum temperature Tmax with the FC upper limit temperature Tlim. When the maximum temperature Tmax is higher than the FC upper limit temperature Tlim, the control system 10 determines a requirement for the increasing process (pre-cooling) to increase the cooling power to be greater than the cooling power set in the ordinary control mode (step S260). The control system 10 subsequently calculates the pre-cooling time period (step S270) using the detailed driving condition calculation result (step S605). This configuration first uses the result of the relatively light process that is estimation of the load applied to the own vehicle 20 to perform refinement and determine the presence or the absence of an overload areas. When it is determined that an overload area is present on the estimated route, a heavier process than the estimation of the load is performed to calculate the pre-cooling time period. There is accordingly no need to perform the heavier process using the driving condition calculation result, when no overload area is present on the estimated route. This configuration accordingly reduces the overall processing volume for pre-cooling.

The series of processing to calculate the pre-cooling time period may be different from that of FIG. 11. According to the embodiment, the air conditioner condenser 43 and the EV radiator 42 are located on the upstream side of the FC radiator 41 in the flow direction of the passing wind that passes through the heat exchange portion 49 in the own vehicle 20. Accordingly, in the process of deriving the maximum temperature Tmax of the coolant in the cooling system 40, the amount of heat generation in the fuel cell 31, the amount of heat generation in the heat exchanger 33 and the amount of heat generation in the EV unit (steps S630 and S640) are used as the first temperature rise amount by which the coolant temperature is increased due to power generation of the fuel cell 31. The temperature of the coolant for cooling the air conditioner that flows into the air conditioner condenser 43 (step S670) is used as the second temperature rise amount by which the coolant temperature is increased due to a factor other than power generation of the fuel cell 31. In a configuration that at least one of the air conditioner condenser 43 and the EV radiator 42 is not located on the upstream side of the FC radiator 41, however, the maximum temperature Tmax of the coolant may be derived without using the corresponding first temperature rise amount or second temperature rise amount. When a heat exchanger located on the upstream side of the FC radiator 41 is used to cool down another device, the maximum temperature Tmax of the coolant may be calculating by additionally using the amount of heat generation in this another drive.

B. Second Embodiment

The configuration of the first embodiment uses the current traffic flow information on the estimated route, in addition to the estimated route, to estimate the load applied to the own vehicle 20 during running of the own vehicle 20 on the estimated route at step S110 of FIG. 3. A different configuration may, however, be employed. A configuration that uses the past traffic flow information in place of the current traffic flow information used in the first embodiment is described below as a second embodiment. The configuration of the second embodiment is similar to the configuration of the first embodiment except a process of estimating the load applied to the own vehicle 20 during running of the own vehicle 20 on the estimated route (step S110). The description of the configuration common with the first embodiment is omitted.

According to the second embodiment, at step S430 in the overload running determination process of FIG. 7, the past average vehicle speed of the other vehicles 21 on the estimated route that is included in the past traffic flow information obtained at step S400 is used as the vehicle speed of the own vehicle 20 to estimate the vehicle speed of the own vehicle 20 on the estimated route. At step S450, a load applied to the own vehicle 20 that runs on the estimated route is estimated using the vehicle speed of the own vehicle 20 estimated at step S430 and the road grade obtained at step S440. This configuration has similar advantageous effects to those of the first embodiment.

C. Third Embodiment

A configuration that uses the driving history of the own vehicle in place of the current traffic flow information used in the first embodiment at step S110 of FIG. 3 is described below as a third embodiment. The configuration of the third embodiment is similar to the configuration of the first embodiment except a process of estimating the load applied to the own vehicle 20 during running of the own vehicle 20 on the estimated route (step S110). The description of the configuration common with the first embodiment is omitted.

According to the third embodiment, at step S430 in the overload running determination process of FIG. 7, a change in average vehicle speed during past running of the own vehicle 20 on the estimated route is extracted from the driving history of the own vehicle 20, in place of estimation of the vehicle speed of the own vehicle 20 using the current traffic flow information. At step S450, a load applied to the own vehicle 20 that runs on the estimated route is estimated using the change in average vehicle speed of the own vehicle 20 obtained at step S430 and the road grade obtained at step S440. In this configuration, information including a change in average vehicle speed during past running of the own vehicle 20 on the estimated route may be stored and learnt in the memory of the controller 50 of the own vehicle 20 or in the storage/learner 64 of the external server 26. This information may be used for the processing of step S430 described above. This configuration has similar advantageous effects to those of the first embodiment.

In a configuration that stores information indicating the load applied to the own vehicle 20 during past running of the own vehicle 20 on the estimated route, as the driving history of the own vehicle 20, the load applied to the own vehicle that runs on the estimated route may be estimated directly from the driving history without performing the processing of steps S430 and S440.

D. Fourth Embodiment

A configuration that uses a parameter indicating a past driving tendency of the own vehicle 20, i.e., a driving tendency of the own vehicle 20 that is different from those of the other vehicles 21, in place of the current traffic flow information used in the first embodiment at step S110 of FIG. 3 is described below as a fourth embodiment. The configuration of the fourth embodiment is similar to the configuration of the first embodiment except a process of estimating the load applied to the own vehicle 20 during running of the own vehicle 20 on the estimated route (step S110). The description of the configuration common with the first embodiment is omitted.

According to the fourth embodiment, at step S430 in the overload running determination process of FIG. 7, the vehicle speed of the own vehicle 20 that runs on the estimated route is estimated using a parameter indicating a driving tendency of the own vehicle 20, in place of estimation of the vehicle speed of the own vehicle 20 using the current traffic flow information. The parameter indicating the driving tendency of the own vehicle 20 is a parameter showing a past driving habit of the own vehicle 20 and is a parameter indicating a driving tendency different from those of the other vehicles 21. The parameter indicating the driving tendency of the own vehicle 20 (hereinafter simply called driving tendency) may be stored in the storage/learner 64 of the external server 26 as described above.

For example, the vehicle speed of the own vehicle 20 may be estimated using the driving tendency of the own vehicle 20 at step S430 as described below. Multiple different levels of driving conditions (conditions including the vehicle speed) may be set with regard to respective roads shown on a map in the memory of the external server 26. For example, the multiple different levels of driving conditions may be level 1 of the lowest vehicle speed to level 10 of the highest vehicle speed with the standard driving conditions set as level 5. During running of the own vehicle 20, the processor 60 of the external server 26 learns the driving tendency of the own vehicle 20. For example, the level of the vehicle speed of the own vehicle 20 relative to the vehicle speeds of the other vehicles 21 may be classified in level 1 of the lowest vehicle speed to level 10 of the highest vehicle speed, based on the average rate of the vehicle speed of the own vehicle 20 to the average vehicle speed of the other vehicles 21 running in the same district, and may be stored as the driving tendency of the own vehicle 20. At step S430, the vehicle speed of the own vehicle 20 that runs on the estimated route may be estimated, based on the driving conditions of the level learnt as the driving tendency of the own vehicle 20 among multiple different levels of driving conditions set in advance with regard to the estimated route. At step S450, a load applied to the own vehicle 20 that runs on the estimated route is estimated using the vehicle speed of the own vehicle 20 estimated at step S430 and the road grade obtained at step S440. This configuration has similar advantageous effects to those of the first embodiment.

E. Modifications

Modification 1:

In the respective embodiments described above, at step S110 of FIG. 3, one of the current traffic flow information on the estimated route, the past traffic flow information on the estimated route, the driving history of the own vehicle 20 and the driving tendency of the own vehicle 20 is used, in addition to the estimated route, to estimate the load applied to the own vehicle 20 during running of the own vehicle 20 on the estimated route. Another configuration may be employed with using at least one of the current traffic flow information on the estimated route, the past traffic flow information on the estimated route, the driving history of the own vehicle 20 and the driving tendency of the own vehicle 20, in addition to the estimated route.

For example, in the process of estimating the vehicle speed of the own vehicle 20 during running on the estimated route at step S430 in each of the first to the fourth embodiments, the estimated vehicle speed obtained as described in each of the first to the fourth embodiments may be corrected using the driving tendency of the own vehicle 20. More specifically, for example, the average rate of the vehicle speed of the own vehicle 20 to the average vehicle speed of the other vehicles 21 running in the same district may be used as the driving tendency of the own vehicle 20, and the estimated vehicle speed of the own vehicle 20 may be corrected by multiplying the estimated vehicle speed by this average rate. In another example, correction of the estimated vehicle speed may be made with the maximum speed of the own vehicle 20 that runs in the specific district described above as the upper limit. This configuration enhances the accuracy of estimation of the load applied to the fuel cell 31 and ensures the more appropriate increasing process.

In another example, an average value of multiple estimated vehicle speeds selected among the estimated vehicle speed of the own vehicle 20 derived from the current traffic flow information on the estimated route (first embodiment), the estimated vehicle speed of the own vehicle 20 derived from the past traffic flow information on the estimated route (second embodiment), the estimated vehicle speed of the own vehicle 20 derived from the driving history of the own vehicle 20 (third embodiment) and the estimated vehicle speed of the own vehicle 20 derived from the driving tendency of the own vehicle 20 (fourth embodiment) may be used as the estimated value of the vehicle speed of the own vehicle 20 obtained at step S430 of FIG. 7.

Modification 2

In the respective embodiments described above, the pre-cooling start time that is a time period elapsed from the present time to the time when pre-cooling is to be started is set (step S780) in the pre-cooling time period calculation process of FIG. 11. A different configuration may be employed. For example, a pre-cooling start distance that is a running distance from the current location to the location where pre-cooling is to be started may be set, in place of the pre-cooling start time. In this modified configuration, the change in first temperature rise amount (steps S630 and S640), the change in second temperature rise amount (step S675) and the change in heat release capacity of the FC radiator 41 (step S735) may be derived as changes corresponding to the running distance of the own vehicle 20 from the current location, in place of the changes corresponding to the time period elapsed from the present time.

Modification 3

In the respective embodiments described above, the pre-cooling start time is set using the driving conditions calculated by the driving condition calculation process of FIG. 9, such that the temperature which the coolant temperature of the cooling system 40 reaches during running of the own vehicle 20 on the estimated route in the ordinary control mode is equal to or lower than the FC upper limit temperature Tlim (as shown in FIG. 11). According to a modification, the pre-cooling start time may be set without estimating the increased temperature of the coolant of the cooling system 40. For example, a requirement or no requirement for pre-cooling may be determined using a change in estimated running load of the own vehicle 20 that runs on the estimated route. When a requirement for pre-cooling is determined, the pre-cooling start time may be set using the change in estimated running load. In this modified configuration, a signal with regard to the driving conditions of the own vehicle 20 received at step S240 of FIG. 5 may include at least a change in estimated running load of the own vehicle 20 that runs on the estimated route. For example, the earlier pre-cooling start timing may be set at the larger integrated value of the load obtained from the change in estimated running load. In this modified configuration, when it is determined that an overload area is present on the estimated route, the increasing process may be performed to increase the cooling power of the cooling system 40 to be greater than the cooling power set in the ordinary control mode, before the own vehicle 20 reaches the overload area. This provides the similar effect of suppressing an excessive increase of the fuel cell temperature.

Modification 4

In the respective embodiments described above, the cooling system 40 of the own vehicle 20 includes the coolant that flows in the coolant flow path 44. A different configuration may be employed. For example, a cooling system provided to cool down the fuel cell may not include a coolant but may be configured to cool down the fuel cell by only air cooling using a cooling fan. In this modified configuration, when it is determined that an overload area is present on the estimated route, the increasing process may be performed to increase the cooling power of the cooling system to be greater than the cooling power set in an ordinary mode, before the own vehicle reaches the overload area. This provides the similar effect of suppressing an excessive increase of the fuel cell temperature.

Modification 5

In the respective embodiments described above, a single estimated route is derived at step S420 of FIG. 7. A different configuration may be employed. For example, in the process of deriving an estimated route using the traffic flow information by selecting a branch destination of the highest potential at a branch point, multiple estimated routes of the higher possibilities may be derived as branch destinations of the highest potential. In this modified configuration, the pre-cooling time period calculation process described above may be performed with regard to each of the derived multiple estimated routes. The processing for pre-cooling may be interrupted with regard to an estimated route that is deviated from the actual location of the own vehicle 20 with progress of running of the own vehicle 20 among the multiple estimated routes. When all the derived multiple estimated routes are deviated from the actual location of the own vehicle 20, the processing for pre-cooling may be restarted to newly derive estimated routes.

This modified configuration reduces the possibility of deviation of the actual location of the own vehicle 20 from the estimated route for which the pre-cooling time period is calculated. This accordingly suppresses a start of pre-cooling from being behind a required timing, due to deviation of the actual location of the own vehicle 20 from the estimated route and a restart of the processing for pre-cooling Modification 6

In the respective embodiments described above, the overload running determination process (step S310 in FIG. 6 and FIG. 7) involved in derivation of an estimated route and identification of an overload rea and the driving condition calculation process (step S340 in FIG. 6 and FIG. 9) involved in calculation of the driving conditions of the own vehicle 20 on the estimated route are performed by the processor 60 on the external server 26-side. The overload running-time water temperature calculation process (step S250 in FIG. 10) involved in deviation of the maximum temperature Tmax of the coolant during running of the own vehicle 20 on the estimated route in the ordinary control mode and the pre-cooling time period calculation process (step S270 in FIG. 11) involved in setting of the pre-cooling start time are performed by the controller 50 on the own vehicle 20-side. These respective processes may be performed by either of the processor 60 on the external server 26-side and the controller 50 on the own vehicle 20-side. For example, the entire pre-cooling control process shown in FIG. 3 may be performed by the processor 60 on the external server 26-side, and the controller 50 on the own vehicle 20-side may simply receive the processing results from the external server 26. In another example, the external server 26 may send information required for the processing to the own vehicle 20, and the controller 50 on the own vehicle 20-side may perform the entire series of processing.

The external server 26, however, serves to obtain the other vehicle information from a large number of the other vehicles 21, derive a large volume of traffic flow information from the other vehicle information and store the large volume of traffic flow information. The configuration that the overload running determination process and the driving conditions calculation process are performed on the external server 26-side does not need to send a large volume of traffic flow information required for the processing from the external server 26 to the own vehicle 20. This preferably reduces the communication load. The driving condition calculation result sent from the external server 26 to the own vehicle 20 in the overload running-time water temperature calculation process is information with regard to the own vehicle 20 that runs on a concretely specified estimated route. Communication of this result provides a significantly lighter communication load, compared with communication of a large volume of traffic flow information with regard to the periphery of the current location of the own vehicle 20.

The disclosure is not limited to any of the embodiments and the modifications described above but may be implemented by a diversity of other configurations without departing from the scope of the disclosure. For example, the technical features of any of the embodiments, the examples and the modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a control method of a fuel cell vehicle equipped with a fuel cell as at least one driving energy source. The fuel cell vehicle comprises a cooling system configured to cool down the fuel cell and a cooling system controller configured to control a cooling power of the cooling system. The cooling system controller has an ordinary control mode as a control mode of controlling the cooling power of the cooling system, wherein the ordinary control mode changes the cooling power of the cooling system to cause a temperature of the fuel cell to be within a predetermined reference temperature range, when it is determined that the temperature of the fuel cell is out of the predetermined reference temperature range, by using at least one of the temperature of the fuel cell, an amount of power generation by the fuel cell and a load request in the fuel cell vehicle. The control method of the fuel cell vehicle comprises estimating a load applied to an own vehicle that is the fuel cell vehicle and that is expected to run on an estimated route, by using at least one of current traffic flow information indicating a current traffic flow on the estimated route, past traffic flow information on the estimated route, a driving history of the own vehicle and a first parameter showing a past driving habit of the own vehicle and indicating a driving tendency of the own vehicle that is different from driving tendencies of other vehicles, in addition to the estimated route where the own vehicle is expected to run; determining whether an overload area that is an area where the temperature of the fuel cell is higher than an appropriate temperature range is present on the estimated route, by using the estimated load; and when determining that the overload area is present on the estimated road, performing an increasing process of increasing the cooling power of the cooling system before the own vehicle reaches the overload area. The increasing process increases the cooling power of the cooling system to be greater than a cooling power set in the ordinary control mode at a time when the increasing process is performed.

When the overload area is present on the estimated route, the control method of the fuel cell vehicle according to this aspect performs the increasing process to increase the cooling power of the cooling system to be greater than the cooling power set in the ordinary control mode, before the own vehicle reaches the overload area. This configuration suppresses an excessive increase in temperature of the fuel cell.

(2) In the control method of the fuel cell vehicle of the above aspect, the estimating the load applied to the own vehicle may comprise estimating the load applied to the own vehicle that runs on the estimated route, by using at least one of the current traffic flow information on the estimated route, the past traffic flow information on the estimated route, the driving history of the own vehicle and the first parameter indicating the driving tendency of the own vehicle; and correcting the estimated load with a second parameter indicating the driving tendency of the own vehicle. The control method of the fuel cell vehicle according to this aspect enhances the accuracy of estimation of the load applied to the fuel cell and enables the increasing process to be performed more appropriately.

(3) In the control method of the fuel cell vehicle of the above aspect, the estimated route may be estimated by using traffic flow information indicating at least one of a current traffic flow and a past traffic flow to specify a branch destination having a highest potential for selection at a branch point on a driving route of the own vehicle as a branch destination of the own vehicle. Even when there is no entry with regard to a destination of the own vehicle, the control method of the fuel cell vehicle according to this aspect performs the increasing process before the own vehicle reaches the overload area. This configuration enhances the possibility of appropriate control to suppress an excessive temperature rise of the fuel cell.

(4) In the control method of the fuel cell vehicle of the above aspect, the performing the increasing process may comprise maximizing the cooling power of the cooling system before the cooling power of the cooling system reaches a maximum in the ordinary control mode. The control method of the fuel cell vehicle according to this aspect enhances the effect of suppressing an excessive temperature rise of the fuel cell.

(5) In the control method of the fuel cell vehicle of the above aspect, the cooling system may include a coolant configured to cool down the fuel cell and a radiator configured to cool down the coolant. The control method may further comprise deriving a first temperature rise amount by which a temperature of the coolant is increased due to power generation of the fuel cell, a second temperature rise amount by which the temperature of the coolant is increased due to a factor other than the power generation of the fuel cell, and a heat release capacity of the radiator; deriving a maximum temperature which the fuel cell reaches when the own vehicle runs on the estimated route in the ordinary control mode, by using the first temperature rise amount, the second temperature rise amount and the heat release capacity; and comparing the maximum temperature with an FC upper limit temperature that is set in advance as an upper limit temperature of the fuel cell, and when the maximum temperature is equal to or lower than the FC upper limit temperature, not performing the increasing process irrespective of determination that the overload area is present on the estimated route. This configuration enables the process of making the temperature of the fuel cell equal to or lower than the FC upper limit temperature to be performed with high accuracy.

The disclosure may be implemented by various aspects other than those described above, for example, a fuel cell vehicle, an external server, a computer program implementing the control method of the fuel cell vehicle, or a non-transitory recording medium in which the computer program is recorded. The disclosure may also be implemented as a control system including a fuel cell vehicle, other vehicles other than the fuel cell vehicle, and an external server.

What is claimed is:

1. A control method of a fuel cell vehicle equipped with a fuel cell as at least one driving energy source, the control method comprising:
controlling a cooling power of a cooling system of the fuel cell vehicle in an ordinary control mode, the cooling system configured to cool down the fuel cell of the fuel cell vehicle, wherein the ordinary control mode changes the cooling power of the cooling system to cause a temperature of the fuel cell to be within a predetermined reference temperature range, when it is determined that the temperature of the fuel cell is out of the predetermined reference temperature range, by using at least one of the temperature of the fuel cell, an amount of power generation by the fuel cell, or a load request in the fuel cell vehicle;

estimating, when the fuel cell vehicle is expected to run on an estimated route, a load applied to the fuel cell vehicle by using at least one of current traffic flow information indicating a current traffic flow on the estimated route, past traffic flow information on the estimated route, a driving history of the fuel cell vehicle, or a first parameter showing a past driving habit of the fuel cell vehicle and indicating a driving tendency of the fuel cell vehicle that is different from driving tendencies of other vehicles, in addition to the estimated route where the fuel cell vehicle is expected to run;

determining whether an overload area that is an area where the temperature of the fuel cell is higher than an appropriate temperature range is present on the estimated route, by using the estimated load; and when it is determined that the overload area is present on the estimated route, performing an increasing process of increasing the cooling power of the cooling system before the fuel cell vehicle reaches the overload area, wherein the increasing process increases the cooling power of the cooling system to be greater than a cooling power set in the ordinary control mode at a time when the increasing process is performed.

2. The control method according to claim 1, wherein estimating the load applied to the fuel cell vehicle comprises:

estimating the load applied to the fuel cell vehicle that runs on the estimated route, by using at least one of the current traffic flow information on the estimated route, the past traffic flow information on the estimated route, the driving history of the fuel cell vehicle, or the first parameter indicating the driving tendency of the fuel cell vehicle; and correcting the estimated load with a second parameter indicating the driving tendency of the fuel cell vehicle.

3. The control method according to claim 1, wherein the estimated route is estimated by using traffic flow information indicating at least one of a current traffic flow or a past traffic flow to specify a branch destination having a highest potential for selection at a branch point on a driving route of the fuel cell vehicle as a branch destination of the fuel cell vehicle.

4. The control method according to claim 1, wherein performing the increasing process comprises:

maximizing the cooling power of the cooling system before the cooling power of the cooling system reaches a maximum in the ordinary control mode.

5. The control method according to claim 1, the control method further comprising:

deriving a first temperature rise amount by which a temperature of a coolant configured to cool down the fuel cell is increased due to power generation of the fuel cell, a second temperature rise amount by which the temperature of the coolant is increased due to a factor other than the power generation of the fuel cell, and a heat release capacity of a radiator configured to cool down the coolant;

deriving a maximum temperature which the fuel cell reaches when the fuel cell vehicle runs on the estimated route in the ordinary control mode, by using the first temperature rise amount, the second temperature rise amount, and the heat release capacity; and comparing the maximum temperature with an FC upper limit temperature that is set in advance as an upper limit temperature of the fuel cell, and when the maximum temperature is equal to or lower than the FC upper limit temperature, not performing the increasing process irrespective of determination that the overload area is present on the estimated route.

6. A fuel cell vehicle equipped with a fuel cell as at least one driving energy source, the fuel cell vehicle comprising:

a cooling system configured to cool down the fuel cell;

a cooling system controller configured to control a cooling power of the cooling system, the cooling system controller having an ordinary control mode as a control mode of controlling the cooling power, wherein the ordinary control mode changes the cooling power of the cooling system to cause a temperature of the fuel cell to be within a predetermined reference temperature range, when it is determined that the temperature of the fuel cell is out of the predetermined reference temperature range, by using at least one of the temperature of the fuel cell, an amount of power generation by the fuel cell, or a load request in the fuel cell vehicle; and an acquirer configured to obtain a signal indicating a driving condition of the fuel cell vehicle that includes a change in an estimated running load of the fuel cell vehicle when the fuel cell vehicle is expected to run on an estimated route, wherein when it is determined that an overload area that is an area where the temperature of the fuel cell is higher than an appropriate temperature range is present on the estimated route, the cooling system controller is configured to use the obtained signal and to perform an increasing process of increasing the cooling power of the cooling system before the fuel cell vehicle reaches the overload area, wherein the increasing process increases the cooling power of the cooling system to be greater than a cooling power set in the ordinary control mode at a time when the increasing process is performed.

7. The fuel cell vehicle according to claim 6, wherein when it is determined that the overload area is present on the estimated route, the cooling system controller is configured to maximize the cooling power of the cooling system before the cooling power of the cooling system reaches a maximum in the ordinary control mode.

8. The fuel cell vehicle according to claim 6, wherein the cooling system includes a coolant configured to cool down the fuel cell and a radiator configured to cool down the coolant, and the cooling system controller is configured:

to derive a first temperature rise amount by which a temperature of the coolant is increased due to power generation of the fuel cell, a second temperature rise amount by which the temperature of the coolant is increased due to a factor other than the power generation of the fuel cell, and a heat release capacity of the radiator;

to derive a maximum temperature which the fuel cell reaches when the fuel cell vehicle runs on the estimated route in the ordinary control mode, by using the first temperature rise amount, the second temperature rise amount, and the heat release capacity; and to compare the maximum temperature with an FC upper limit temperature that is set in advance as an upper limit temperature of the fuel cell, and when the maximum temperature is equal to or lower than the FC upper limit temperature, not to perform the increasing process irrespective of whether the overload area is determined to be present on the estimated route.

* * * * *